United States Patent
Nagura

(10) Patent No.: US 9,383,230 B2
(45) Date of Patent: Jul. 5, 2016

(54) POSITION DETECTION APPARATUS, LENS APPARATUS, IMAGE PICKUP SYSTEM, MACHINE TOOL APPARATUS, POSITION DETECTION METHOD, AND NON-TRANSITORY COMPUTER-READABLE STORAGE MEDIUM

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 14/208,360

(22) Filed: Mar. 13, 2014

(65) Prior Publication Data

US 2014/0267823 A1    Sep. 18, 2014

(30) Foreign Application Priority Data

Mar. 15, 2013 (JP) ................................. 2013-052748

(51) Int. Cl.
G01D 5/347 (2006.01)
B25J 9/16 (2006.01)
G02B 7/02 (2006.01)

(52) U.S. Cl.
CPC ............ *G01D 5/3473* (2013.01); *B25J 9/1697* (2013.01); *G02B 7/02* (2013.01)

(58) Field of Classification Search
CPC .................................................. G01D 5/34715
USPC ...................................................... 250/231.13
See application file for complete search history.

(56) References Cited

FOREIGN PATENT DOCUMENTS

JP          61-108914 A          5/1986

*Primary Examiner* — Renee D Chavez
(74) *Attorney, Agent, or Firm* — Rossi, Kimms & McDowell LLP

(57) ABSTRACT

A position detection apparatus (100) including a scale (20) including a pattern periodically formed, a detector (10) configured to be movable relative to the scale, and a signal processor (30), the signal processor (30) includes first to seventh periodic signal generating units (33, 34, 35, 36, 37, 38, and 39) which generate first to seventh periodic signals respectively, the first periodic signal generating unit synthesizes the fourth periodic signal and the fifth periodic signal to generate the first periodic signal, and the second periodic signal generating unit synthesizes the sixth periodic signal and the seventh periodic signal to generate the second periodic signal.

12 Claims, 14 Drawing Sheets

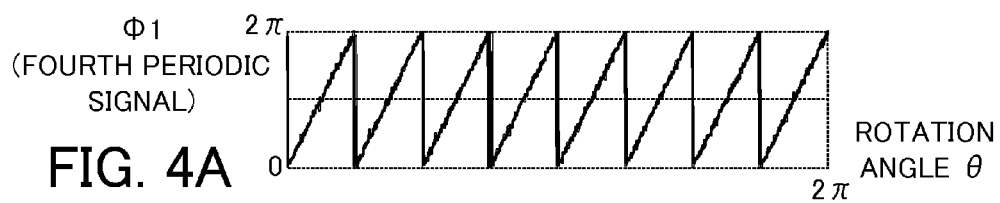
FIG. 4A  Φ1 (FOURTH PERIODIC SIGNAL)
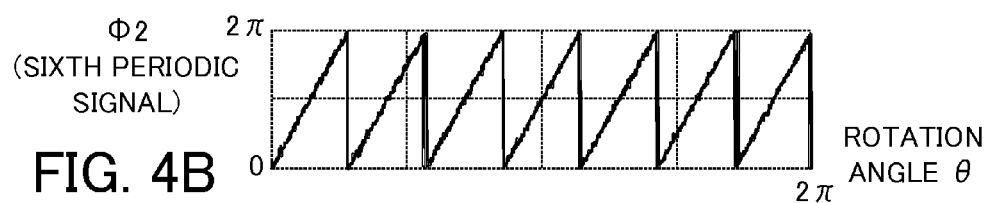
FIG. 4B  Φ2 (SIXTH PERIODIC SIGNAL)
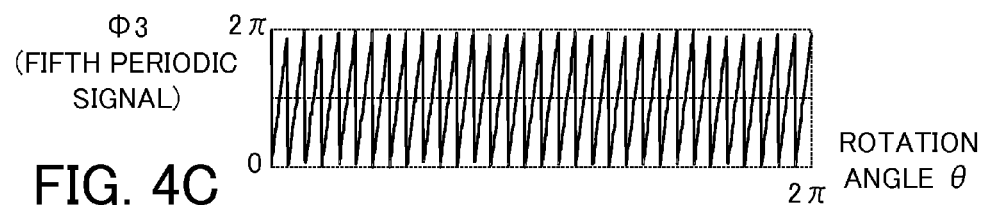
FIG. 4C  Φ3 (FIFTH PERIODIC SIGNAL)
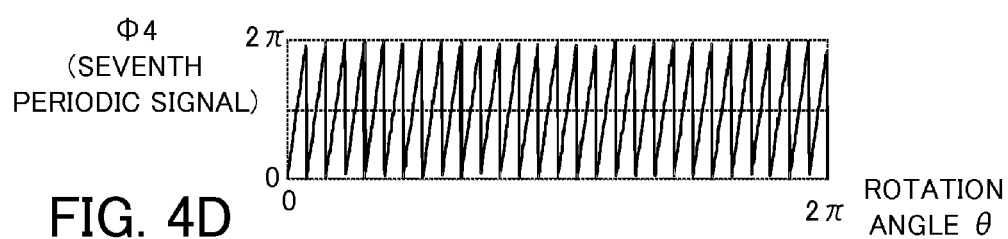
FIG. 4D  Φ4 (SEVENTH PERIODIC SIGNAL)

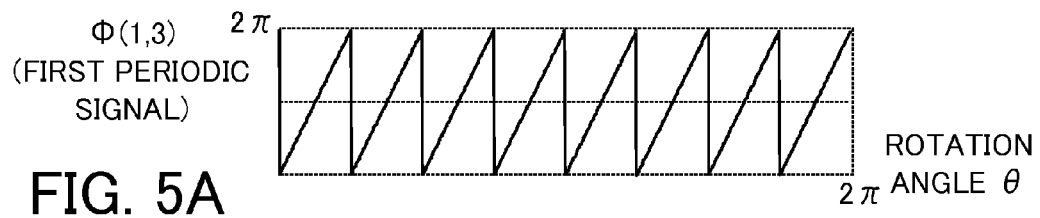

POSITION DETECTION APPARATUS, LENS APPARATUS, IMAGE PICKUP SYSTEM, MACHINE TOOL APPARATUS, POSITION DETECTION METHOD, AND NON-TRANSITORY COMPUTER-READABLE STORAGE MEDIUM

BACKGROUND OF THE INVENTION

1. Field of the Invention

The present invention relates to a position detection apparatus which detects an absolute position of an object.

2. Description of the Related Art

Previously, an incremental encoder and an absolute encoder as position detection apparatuses have been known. The incremental encoder can be easily configured, but there are disadvantages that position information or angle information is lost and an error is accumulated due to an exogenous noise when an electric power is turned off. On the other hand, the absolute encoder typically has advantages that an error is not accumulated with high accuracy and that it is unnecessary to move to a reference position (a home position) even when the electric power is turned off.

Japanese Patent Laid-open No. S61-108914 discloses an absolute encoder that detects an absolute position. In the configuration of Japanese Patent Laid-open No. S61-108914, an upper-level position signal which has a period rougher than a period of an original signal is generated based on a difference of phases obtained from two scales having periods different from each other. In addition, based on the generated upper-level position signal, a position of a periodic signal finer (shorter) than the upper-level position signal within a period of the upper-level position signal is specified to be converted into a position signal with high accuracy.

However, in the configuration of Japanese Patent Laid-open No. S61-108914, the upper-level position signal is generated by using the difference between the two phase signals which are generated by two pairs of sine waves and cosine waves. Therefore, an error contained in the upper-level position signal is greater than an error contained in the original phase signal. When the position of the periodic signal finer (shorter) than the upper-level position signal within the period of the upper-level position signal is specified by using the upper-level position signal, an error detection may easily occur due to the error of the upper-level position signal. Therefore, a detection region (a detection stroke) is limited.

BRIEF SUMMARY OF THE INVENTION

The present invention provides a position detection apparatus, a lens apparatus, an image pickup system, a machine tool apparatus, a position detection method, and a non-transitory computer-readable storage medium which are capable of detecting an absolute position over a wide range with high accuracy.

A position detection apparatus as one aspect of the present invention detects a position of an object, and includes a scale including a pattern periodically formed, a detector configured to be movable relative to the scale, and a signal processor configured to process an output signal of the detector to obtain position information of the object, the signal processor includes a first periodic signal generating unit configured to generate a first periodic signal, a second periodic signal generating unit configured to generate a second periodic signal having a period different from a period of the first periodic signal, a third periodic signal generating unit configured to generate a third periodic signal having a period longer than the period of each of the first and second periodic signals by using the first and second periodic signals, a fourth periodic signal generating unit configured to generate a fourth periodic signal having the same period as the period of the first periodic signal, a fifth periodic signal generating unit configured to generate a fifth periodic signal having a period which is a fraction of an integer of the period of the fourth periodic signal, a sixth periodic signal generating unit configured to generate a sixth periodic signal having the same period as the period of the second periodic signal, and a seventh periodic signal generating unit configured to generate a seventh periodic signal having a period which is a fraction of an integer of the period of the sixth periodic signal, the first periodic signal generating unit synthesizes the fourth periodic signal and the fifth periodic signal to generate the first periodic signal, and the second periodic signal generating unit synthesizes the sixth periodic signal and the seventh periodic signal to generate the second periodic signal.

A lens apparatus as another aspect of the present invention includes a lens displaceable in an optical axis direction and the position detection apparatus configured to detect a position of the lens.

An image pickup system as another aspect of the present invention includes the lens apparatus, and an image pickup apparatus including an image pickup element configured to photoelectrically convert an optical image formed via the lens.

A machine tool apparatus as another aspect of the present invention includes a machine tool including at least one of a robot arm and a conveyer configured to convey an object to be assembled, and the position detection apparatus configured to detect at least one of a position and an attitude of the machine tool.

A position detection method as another aspect of the present invention is a method of detecting a position of an object which moves along with a scale or a detector based on an output signal from the detector, the detector being configured to be movable relative to the scale, the scale including a pattern periodically formed, and the method includes the steps of generating a fourth periodic signal having the same period as a period of a first periodic signal, a fifth periodic signal having a period which is a fraction of an integer of the period of the fourth periodic signal, a sixth periodic signal having the same period as a period of a second periodic signal, the second periodic signal having the period different from the period of the first periodic signal, a seventh periodic signal having a period which is a fraction of an integer of the period of the sixth periodic signal, synthesizing the fourth periodic signal and the fifth periodic signal to generate the first periodic signal, synthesizing the sixth periodic signal and the seventh periodic signal to generate the second periodic signal, and generating a third periodic signal having a period longer than the period of each of the first and second periodic signals by using the first and second periodic signals.

A non-transitory computer-readable storage medium as another aspect of the present invention stores a program which causes a computer to execute the position detection method.

Further features and aspects of the present invention will become apparent from the following description of exemplary embodiments with reference to the attached drawings.

BRIEF DESCRIPTION OF THE DRAWINGS

FIGS. 4A to 4D are diagrams of illustrating relationships between periodic signals Φ1, Φ2, Φ3, and Φ4 respectively, and a rotation angle θ in Embodiment 1.

FIGS. 5A to 5D are diagrams of illustrating relationships between periodic signals Φ(1,3), Φ(2,4), Φ5, and an absolute position signal ΦABS respectively, and the rotation angle θ in Embodiment 1.

DESCRIPTION OF THE EMBODIMENTS

Figure 1:
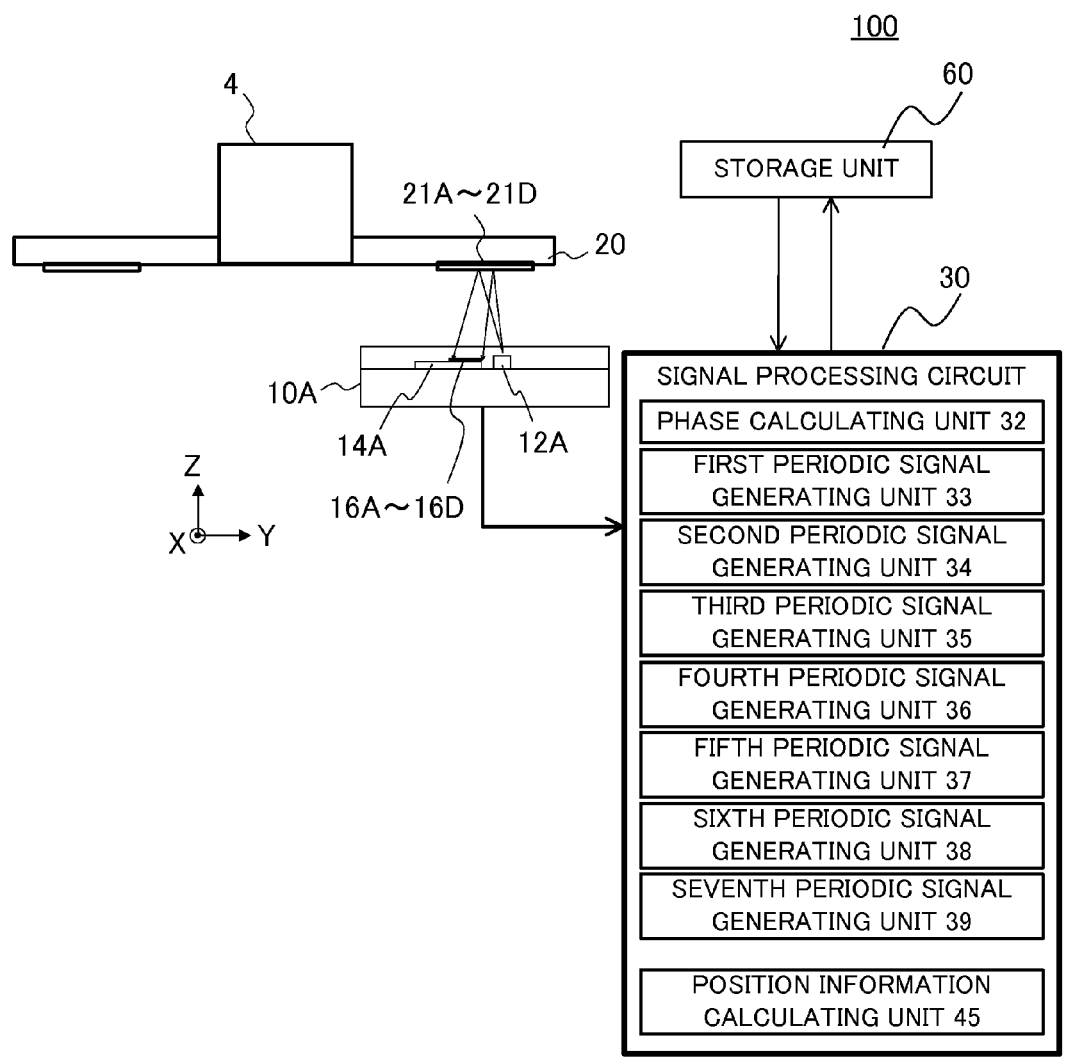
FIG. 1 is a configuration diagram of a position detection apparatus (an encoder) in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, referring to FIG. 1, a position detection apparatus in Embodiment 1 of the present invention will be described. FIG. 1 is a configuration diagram of a position detection apparatus (an encoder 100) in the present embodiment. The encoder 100 is a position detection apparatus which detects a position of an object (an object to be measured). The encoder 100 is an optical encoder, which includes a sensor unit 10A attached to a fixed portion, a rotary scale 20 attached to a movable portion 4 (a rotating movable portion), a signal processing circuit 30 (a signal processor), and a storage unit 60. In the present embodiment, the sensor unit 10A and the scale 20 only need to be movable relative to each other, and the sensor unit 10A can also be attached to the movable portion 4 while the scale 20 is attached to the fixed portion. In the present embodiment, the object moves along with (integrally with) the scale 20 or the sensor unit 10A.

The sensor unit 10A (a detector) is a light emitting and receiving sensor unit which includes a light source 12A including an LED and a light receiving IC 14A including light receiving element arrays 16A to 16D mounted in a package. The sensor unit 10A is configured to be movable relative to the scale 20. Each of the light receiving element arrays 16A to 16D functions as a detection element array in which a plurality of detection elements that detects an energy distribution obtained from a pattern of the scale 20 are arrayed in an X direction that is a rotational tangential direction (a length measurement direction) of the scale 20 (or the movable portion 4). In the present embodiment, the energy is light. However, the present embodiment is not limited to this, and is also applicable to a case where a magnetic power or an electric power is used as the energy. The same is true for each embodiment described below.

The scale 20 is provided with tracks 21A to 21D. A pattern array (a periodic pattern) including a plurality of pattern constituted by a chromium reflection film formed on a glass substrate is formed (patterned) on the tracks 21A to 21D. The pattern of the present embodiment is a pattern to spatially modulate an energy distribution. In the present embodiment, each of the light receiving element arrays 16A to 16D receives reflected light from the pattern of the scale 20, but the embodiment is not limited to this. The present embodiment is also applicable to a case where transmitted light through the pattern of the scale 20 is received. In other words, the light receiving element arrays 16A to 16D only need to be capable of receiving light from the pattern of the scale 20.

The signal processing circuit 30 (the signal processor) processes an output signal of the light receiving element arrays 16A to 16D of the sensor unit 10A to obtain position information (position information of the object). The signal processing circuit 30 also performs interpolation processing on an encoder signal obtained from the sensor unit 10A, and writes and reads a signal from and to the storage unit 60.

When the position information of the scale 20 is detected, a divergent light beam emitted from the light source 12A of the sensor unit 10A is illuminated on and then reflected by the tracks 21A to 21D of the scale 20. The light beams reflected by the tracks 21A to 21D are received by the light receiving element arrays 16A to 16D of the sensor unit 10A. The light receiving element arrays 16A to 16D receive light beams as double-sized images of reflectance distributions of the tracks 21A to 21D. The light beams received by the light receiving element arrays 16A to 16D are converted into electric signals, and are sent to the signal processing circuit 30 as an encoder signal. The signal processing circuit 30 converts the output signal of the light receiving element arrays 16A to 16D into the position information, and obtains and outputs the position information of the scale 20 (the object) with high accuracy.

The signal processing circuit 30 includes a phase calculating unit 32, first to seventh periodic signal generating units 33 to 39, and a position information calculating unit 45 in addition to a noise filter, an amplifier circuit, and an A/D converter (not shown). The phase calculating unit 32 performs an arctangent calculation for digital signals obtained by converting the output signals (analog signals) of the light receiving element arrays 16A to 16D by the A/D converter. As a result, the phase calculating unit 32 obtains a phase of the energy distribution from the pattern of the scale 20. The position information calculating unit 45 obtains position information of the scale 20 (the object). The position information calculating unit 45 may also have a relative position signal calculating unit that obtains a relative position signal representing a relative position of the scale 20 and an absolute position signal calculating unit that obtains an absolute position signal representing an absolute position of the scale 20.

Figure 2:
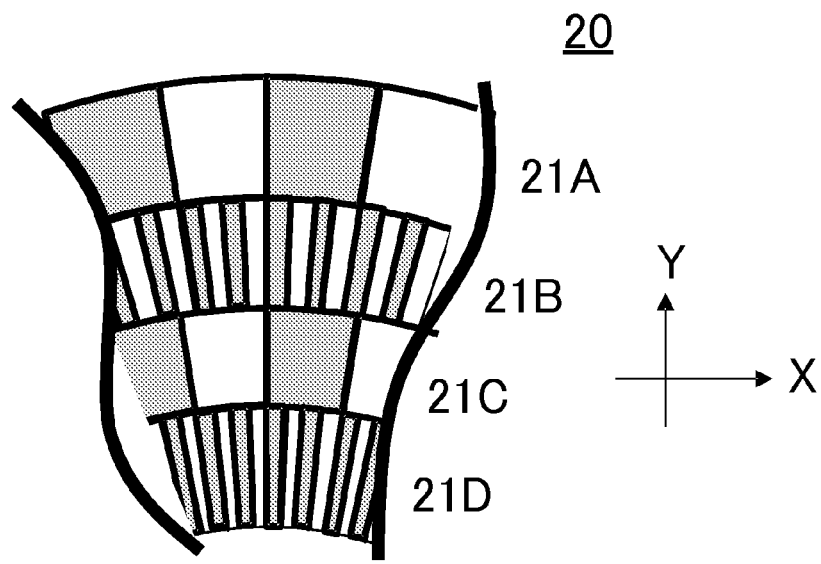
FIG. 2 is a plan view of a track of a scale in Embodiment 1.

Subsequently, referring to FIG. 2, the configuration of the tracks 21A to 21D of the scale 20 will be described. FIG. 2 is a plan view of the tracks 21A to 21D of the scale 20. The rotary scale 20 is provided with four types of tracks 21A to 21D as slit arrays at positions where radii are different from each other. Periods (the number of periods) of the slit arrays in the tracks 21A to 21D are 8 periods, 7 periods, 32 periods, and 28 periods per one cycle, respectively.

Figure 3:
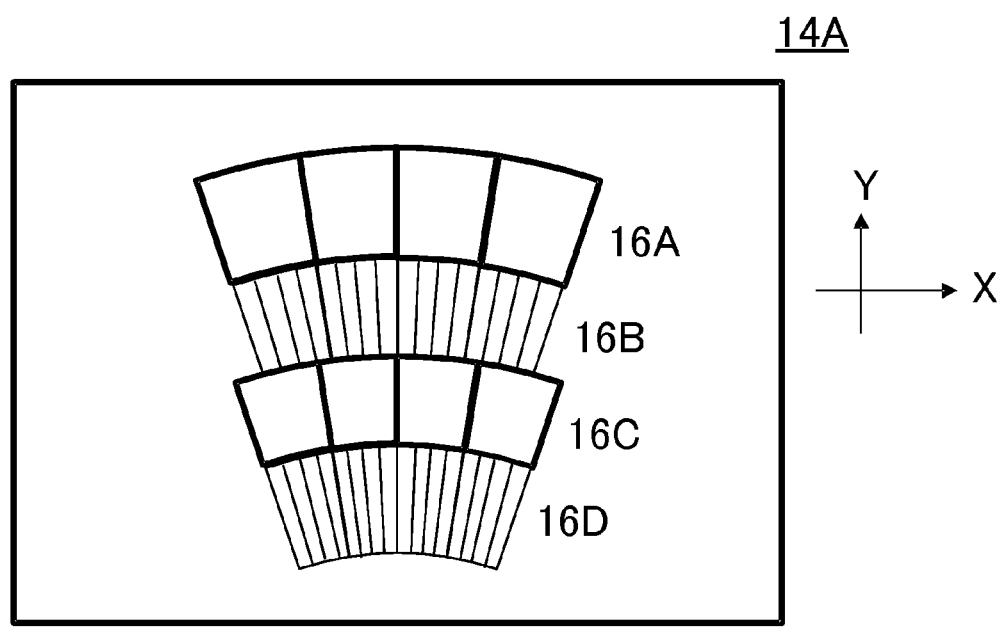
FIG. 3 is a plan view of a light receiving surface of a light receiving element array in Embodiment 1.

Subsequently, referring to FIG. 3, the configuration of the light receiving element arrays 16A to 16D of the light receiving IC 14A will be described. FIG. 3 is a plan view of the light receiving element arrays 16A to 16D of the light receiving IC 14A. In the present embodiment, four light receiving element arrays 16A to 16D are provided in accordance with detection periods corresponding to the periods of the four types of tracks 21A to 21D and positions of reflected images.

The phase calculating unit 32 obtains each of phase signals based on electric signals obtained from the light receiving element arrays 16A to 16D corresponding to respective slit arrays. The fourth periodic signal generating unit 36 obtains a periodic signal (a fourth periodic signal) which satisfies the relation of $\Phi1=8\theta$ where $\theta$ is a rotation angle of the rotating movable portion, based on a phase signal obtained from the light receiving element array 16A. Similarly, the sixth periodic signal generating unit 38 obtains a periodic signal (a sixth periodic signal) which satisfies the relation of $\Phi2=7\theta$ based on a phase signal obtained from the light receiving element arrays 16C. The fifth periodic signal generating unit 37 obtains a periodic signal (a fifth periodic signal) which satisfies the relation of $\Phi3=32\theta$ based on a phase signal obtained from the light receiving element array 16B. The seventh periodic signal generating unit 39 obtains a periodic signal (a seventh periodic signal) which satisfies the relation of $\Phi4=28\theta$ based on a phase signal obtained from the light receiving element array 16D. An offset is added to each of the periodic signals $\Phi1$ to $\Phi4$ so that the phases become zero simultaneously at a predetermined position.

Subsequently, referring to FIGS. 4A to 4D, the periodic signals $\Phi1$, $\Phi2$, $\Phi3$, and $\Phi4$ for the rotation angle $\theta$ of the movable portion 4 will be described. FIGS. 4A to 4D are diagrams of illustrating the relationship between the periodic signals $\Phi1$, $\Phi2$, $\Phi3$, and $\Phi4$ (detected values) respectively, and the rotation angle $\theta$. In FIGS. 4A to 4D, 0.1[rad rms] is superimposed on the periodic signals $\Phi1$, $\Phi2$, $\Phi3$, and $\Phi4$ as uncorrelated error components $\sigma1$ to $\sigma4$ according to a normal distribution, respectively.

The first periodic signal generating unit 33 of the signal processing circuit 30 performs a calculation represented by the following Expression (1). In other words, the first periodic signal generating unit 33 calculates a position of the periodic signal $\Phi3$ within a period of the periodic signal $\Phi1$ (the number of periods where the phase of the periodic signal $\Phi3$ is positioned) by using the periodic signals $\Phi1$ and $\Phi3$, and connects the periodic signals $\Phi3$. Thus, the periodic signal $\Phi(1,3)$ having the same period as the period of the periodic signal $\Phi1$, i.e. a first periodic signal, is obtained with an accuracy equivalent to a position detection accuracy of the periodic signal $\Phi3$. In the present embodiment, the processing performed by the first periodic signal generating unit 33 is referred to as first synthesis processing.

$$\Phi(1,3)=\text{MOD}\ [(2\pi\cdot\text{ROUND}[(4\cdot\Phi1-\Phi3)/(2\pi)]+\Phi3)\cdot1/4,2\pi] \quad (1)$$

In Expression (1), symbol ROUND[x] denotes a function of converting x into the nearest integer. Symbol MOD [x,y] denotes a remainder where x is a dividend and y is a divisor. The remainder of $2\pi$ as a divisor is obtained in order to express the phase as a value more than or equal to 0 but less than $2\pi$. The periodic signal $\Phi(1,3)$ obtained by the first synthesis processing for the rotation angle $\theta$ of the movable portion 4 is illustrated in FIG. 5A.

Similarly, the second periodic signal generating unit 34 calculates a position of the periodic signal $\Phi4$ within the period of the periodic signal $\Phi2$ (the number of periods where the phase of the periodic signal $\Phi4$ is positioned) by using the periodic signals $\Phi2$ and $\Phi4$ in accordance with the calculation represented by the following Expression (2), and connects the periodic signals $\Phi4$. Thus, the periodic signal $\Phi(2,4)$ having the same period as the period of the periodic signal $\Phi2$, i.e. a second periodic signal, is obtained with an accuracy equivalent to a position detection accuracy of the periodic signal $\Phi4$. In the present embodiment, the processing performed by the second periodic signal generating unit 34 is referred to as second synthesis processing.

$$\Phi(2,4)=\text{MOD}\ [(2\pi\cdot\text{ROUND}[(4\cdot\Phi2-\Phi4)/(2\pi)]+\Phi4)\cdot1/4,2\pi] \quad (2)$$

The periodic signal $\Phi(2,4)$ obtained by the second synthesis processing for the rotation angle $\theta$ of the movable portion 4 is illustrated in FIG. 5B.

Subsequently, the third periodic signal generating unit 35 performs the calculation represented by the following Expression (3) to obtain an upper-level periodic signal $\Phi5$ (a third periodic signal) which has the longest period.

$$\Phi5=\text{MOD}\ [\Phi(1,3)-\Phi(2,4),2\pi]=1\theta \quad (3)$$

The relationship between the periodic signal $\Phi5$ and the rotation angle $\theta$ of the movable portion 4 is illustrated in FIG. 5C.

Next, a procedure of calculating an absolute position signal (an absolute value signal) based on the periodic signal $\Phi5$ and the periodic signal $\Phi(1,3)$ generated as described above will be described. In the present embodiment, the periodic signal $\Phi5$ is a first level signal that has the longest period, and the periodic signal $\Phi(1,3)$ is a second level signal. The position information calculating unit 45 generates a periodic signal having the same period as the period of the first level signal (the periodic signal $\Phi5$) as an absolute position signal (DABS (an absolute value signal) with an accuracy equivalent to a position detection accuracy of the second level signal. In the present embodiment, the processing performed by the position information calculating unit 45 is referred to as a third synthesis processing.

The absolute position signal $\Phi$ABS (the absolute value signal) is calculated as represented by the following Expression (4).

$$\Phi\text{ABS}=\text{MOD}\ [(2\pi\cdot\text{ROUND}[(8\cdot\Phi5-\Phi(1,3))/(2\pi)]+\Phi(1,3))\cdot1/8,2\pi] \quad (4)$$

The relationship between the absolute position signal $\Phi$ABS and the rotation angle $\theta$ of the movable portion 4 is illustrated in FIG. 5D. Thus, according to the present embodiment, the absolute position can be detected over a whole circumference.

However, in order that the signal generated by the first to third synthesis processing keeps the continuity and indicates correct position information, a phase error contained in each signal needs to be suppressed within a certain range. For example, in order to keep the continuity of the periodic signal $\Phi(1,3)$ generated by the first synthesis processing, an error of the calculation result of $(4\cdot\Phi1-\Phi3)$ with respect to an ideal value needs to be within ±π rad. Similarly, in order to keep the continuity of the periodic signal Φ(2,4) generated by the second synthesis processing, an error of the calculation result of (4·Φ2−Φ4) with respect to an ideal value needs to be within ±π rad. Furthermore, in order to keep the continuity of the absolute position signal ΦABS generated by the third synthesis processing, an error of the calculation result of (8·Φ5−Φ(1,3)) with respect to an ideal value needs to be within ±π rad.

For example, it is assumed that 0.1 [rad rms] is superimposed on the periodic signals Φ1, Φ2, Φ3, and Φ4 as uncorrelated error components σ1 to σ4 according to a normal distribution, respectively. The error contained in the calculation result of (4·Φ1−Φ3) in the first synthesis processing with respect to an ideal value is represented as 4×σ1−σ3. An estimated amplitude in this case is $(0.4^2+0.1^2)^{0.5}=0.41$ [rad rms], and is ±2.5 rad when assuming ±6σ as a maximum error amplitude. The error contained in the calculation result of (4·Φ2−Φ4) in the second synthesis processing with respect to an ideal value is represented as 4×σ2−σ4. An estimated amplitude in this case is $(0.4^2+0.1^2)^{0.5}=0.41$ [rad rms], and is ±2.5 rad when assuming ±6σ as a maximum error amplitude.

Subsequently, an error of the calculation result of (8·Φ5−Φ(1,3)) in the third synthesis processing with respect to an ideal value is considered. First, a phase error σ5 of the periodic signal Φ5 (an upper-level signal) is represented as the following Expression (5) by using a phase error σ(1,3) of the periodic signal Φ(1,3) and a phase error σ(2,4) of the periodic signal Φ(2,4).

$$\sigma5=\sigma(1,3)-\sigma(2,4) \quad (5)$$

In the embodiment, according to Expressions (1) and (2), the following Expressions (6) and (7) are satisfied.

$$\sigma(1,3)=\sigma3/4 \quad (6)$$

$$\sigma(2,4)=\sigma4/4 \quad (7)$$

As described above, the estimated amplitude of the phase error σ5 of the phase signal Φ5 (the upper-level signal) is $(0.025^2+0.025^2)^{0.5}=0.035$ [rad rms]. Accordingly, the estimated error amplitude of the calculation result of (8·Φ5−(1,3)) in the third synthesis processing with respect to an ideal value is $((8\times0.035)^2+0.025^2)^{0.5}=0.28$ [rad rms]. When assuming ±6σ as a maximum error amplitude, the error amplitude is ±1.7 rad.

As described above, the phase error amplitudes in the first to third synthesis processing are ±2.5 rad, ±2.5 rad, and ±1.7 rad, respectively, each of which is within ±π rad, and therefore the continuity of the absolute position signal is kept. In other words, an absolute position over a whole circumference can be detected with an accuracy equivalent to the position detection accuracy of the periodic signal Φ3.

Thus, the signal processing circuit 30 of the present embodiment includes the first to seventh periodic signal generating units 33 to 39. The first periodic signal generating unit 33 generates the first periodic signal. The second periodic signal generating unit 34 generates the second periodic signal having a period different from a period of the first periodic signal. The third periodic signal generating unit 35 generates the third periodic signal having a period longer than the period of each of the first and second periodic signals by using the first and second periodic signals. The fourth periodic signal generating unit 36 generates the fourth periodic signal having the same period as the period of the first periodic signal. The fifth periodic signal generating unit 37 generates the fifth periodic signal having a period which is a fraction of an integer of the period of the fourth periodic signal. The sixth periodic signal generating unit 38 generates the sixth periodic signal having the same period as the period of the second periodic signal. The seventh periodic signal generating unit 39 generates the seventh periodic signal having a period which is a fraction of an integer of the period of the sixth periodic signal. The first periodic signal generating unit 33 synthesizes (combines) the fourth periodic signal and the fifth periodic signal to generate the first periodic signal. The second periodic signal generating unit 34 synthesizes (combines) the sixth periodic signal and the seventh periodic signal to generate the second periodic signal. The "fraction of an integer" means a specified faction of the integer, i.e. 1/N (N: an integer).

In the present embodiment, the first periodic signal generating unit 33 specifies a position of the fifth periodic signal within the period of the fourth periodic signal by using the fourth periodic signal and the fifth periodic signal to generate the first periodic signal. The second periodic signal generating unit 34 specifies a position of the seventh periodic signal within the period of the sixth periodic signal by using the sixth periodic signal and the seventh periodic signal to generate the second periodic signal.

In the present embodiment, the signal processing circuit 30 includes the position information calculating unit 45 which generates an absolute position signal by using the first periodic signal and the third periodic signal. In the present embodiment, the fifth periodic signal and the seventh periodic signal may also be common to each other.

Figure 19:
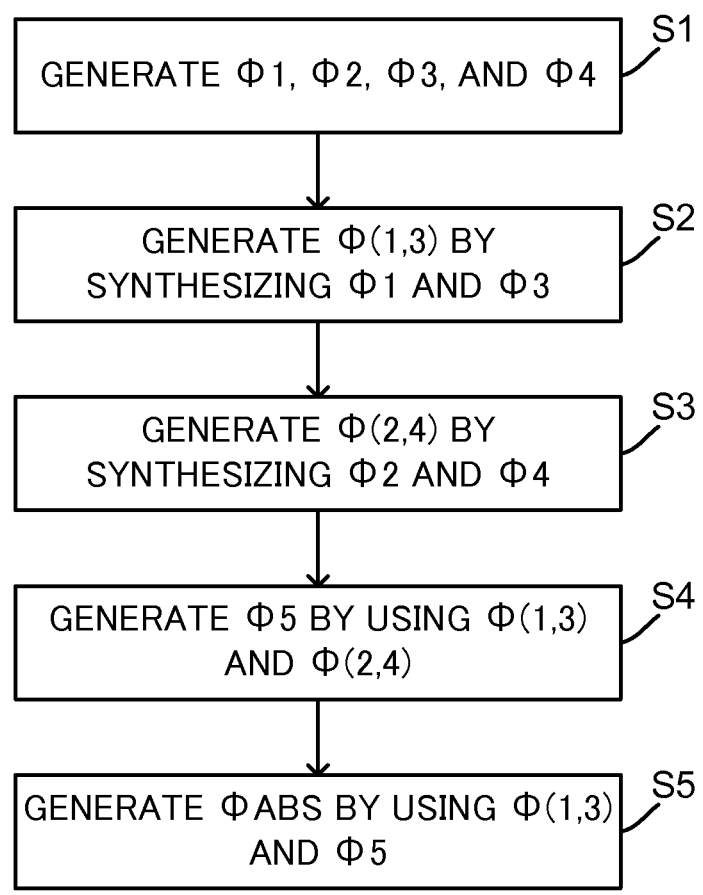
FIG. 19 is a flowchart of a position detection method in Embodiment 1.

FIG. 19 illustrates a flowchart of a position detection method in the present embodiment. First of all, in Step S1, the fourth periodic signal generating unit 36 generates the periodic signal Φ1 (the fourth periodic signal). The sixth periodic signal generating unit 38 generates the periodic signal Φ2 (the sixth periodic signal). The fifth periodic signal generating unit 37 generates the periodic signal Φ3 (the fifth periodic signal). The seventh periodic signal generating unit 39 generates the periodic signal Φ4 (the seventh periodic signal).

Subsequently, in Step S2, the first periodic signal generating unit 33 synthesizes (combines) the periodic signal Φ1 and the periodic signal Φ3 to generate the periodic signal Φ(1,3) that is the first periodic signal. Furthermore, in Step S3, the second periodic signal generating unit 34 synthesizes (combines) the periodic signal Φ2 and the periodic signal Φ4 to generate the periodic signal Φ(2,4) that is the second periodic signal. Subsequently, in Step S4, the third periodic signal generating unit 35 generates the periodic signal Φ5 (the third periodic signal) by using the periodic signal Φ(1,3) and the periodic signal Φ(2,4).

In the position detection method of the present embodiment, the flow proceeds to Step S5 if necessary. In Step S5, the position information calculating unit 45 generates the absolute position signal ΦABS by using the periodic signal Φ(1,3) and the periodic signal Φ5. In the present embodiment, this position detection method can also be provided as a program to cause an information processing apparatus (a computer) to execute the process described above.

In the present embodiment, when the signal processor 30 generates the upper-level signal having a long period, it previously performs synthesis processing by using a periodic signal which has a period having a relation of an integral multiple, and thus an error permissible amount to detect the absolute position signal can be enlarged.

In the present embodiment, the optical encoder is used as a position detection apparatus, but the embodiment is not limited to this. As the position detection apparatus, a magnetic encoder, a capacitance sensor, or the like can also be used to obtain similar effects. When the magnetic encoder is used, a magnetic material is used as the scale 20, and the magnetic polarity distribution is formed with a shape similar to that of the reflection film of the scale 20 of the present embodiment. A position is detected by using arrayed magnetic field detection elements provided near this scale. On the other hand, when the capacitance encoder is used, a conductive electrode pattern is formed with a shape similar to that of the reflection film of the scale 20 of the present embodiment, and a position is detected by another arrayed electrode pattern provided oppositely to the conductive electrode pattern.

The present embodiment describes the rotary encoder, but is not limited to this, and the embodiment is also applicable to a linear encoder. The same is true for each embodiment described below.

In the present embodiment, a serial code such as well-known M series may also be used as the first periodic signal or the second periodic signal. In this case, the reflection film of the scale 20 is configured as a serial code pattern in series in a moving direction, and a light and dark pattern distribution of reflected light is detected by a photodiode array to read a code corresponding to a position.

In the present embodiment, the fourth and fifth periodic signals are detected by a light receiving element array which is different from that of detecting the sixth and sevenths periodic signals, but the fourth to seventh periodic signals may also be detected by a common light receiving element array. For example, as will be described in Embodiment 2, a switch circuit may switch intervals of electrical addition in a plurality of light receiving elements 17 to detect each periodic signal separately. Alternatively, a light receiving element array 16 may be used as a linear image sensor such as a CCD to detect an output value of each of the light receiving elements 17, and the signal processing circuit 30 may perform a calculation so as to separate each periodic signal. In this case, detection of a periodic slit pattern and detection of a serial code pattern in series in a moving direction can also be detected by using a common light receiving element array.

Comparative Example 1

Next, as a comparative example for Embodiment 1, a case where the configuration of Embodiment 1 is not adopted will be described. Using a scale similar to the scale 20 of Embodiment 1, the phase calculating unit 32 obtains each phase signal based on an electric signal obtained from a light receiving element array corresponding to each slit array. In addition, the periodic signals Φ6 and Φ7 are obtained by a difference between the phase signals of the periodic signals Φ1 and Φ2 and a difference between the phase signals of the periodic signals Φ3 and Φ4, respectively.

$$\Phi 6 = \text{MOD}\ [\Phi 1 - \Phi 2, 2\pi] = 1\theta \quad (8)$$

$$\Phi 7 = \text{MOD}\ [\Phi 3 - \Phi 4, 2\pi] = 4\theta \quad (9)$$

As described below, the periodic signals Φ6, Φ7, Φ1, and Φ3 are denoted by first to fourth level signals in order of length of periods from longest to shortest, respectively.
FIRST LEVEL SIGNAL: Φ6=1θ
SECOND LEVEL SIGNAL: Φ7=4θ
THIRD LEVEL SIGNAL: Φ1=8θ
FOURTH LEVEL SIGNAL: Φ3=32θ

First of all, using the first level signal (the periodic signal Φ6) and the second level signal (the periodic signal Φ7), a periodic signal Φ(6,7) having the same period as the period of the first level signal is generated with an accuracy equivalent to a position detection accuracy of the second level signal. The periodic signal Φ(6,7) is represented as the following Expression (10).

$$\Phi(6,7) = \text{MOD}\ [(2\pi \cdot \text{ROUND}[(4 \cdot \Phi 6 - \Phi 7)/(2\pi)] + \Phi 7) \cdot 1/4, 2\pi] \quad (10)$$

An error component of (4·Φ6−Φ7) in this calculation is represented as 4×(σ1−σ2)−(σ3−σ4). The amplitude is estimated as the following Expression (11).

$$((4 \times (0.1^2 + 0.1^2)^{0.5})^2 + ((0.1^2 + 0.1^2)^{0.5})^2)^{0.5} = 0.58 [\text{rad rms}] \quad (11)$$

When the maximum error amount is assumed to be ±6σ in this comparative example, ±3.5 rad is obtained. Since phase error amplitude exceeds ±π [rad], the continuity of the absolute position signal is not kept, and therefore a correct position cannot be detected.

Embodiment 2

Figure 6:
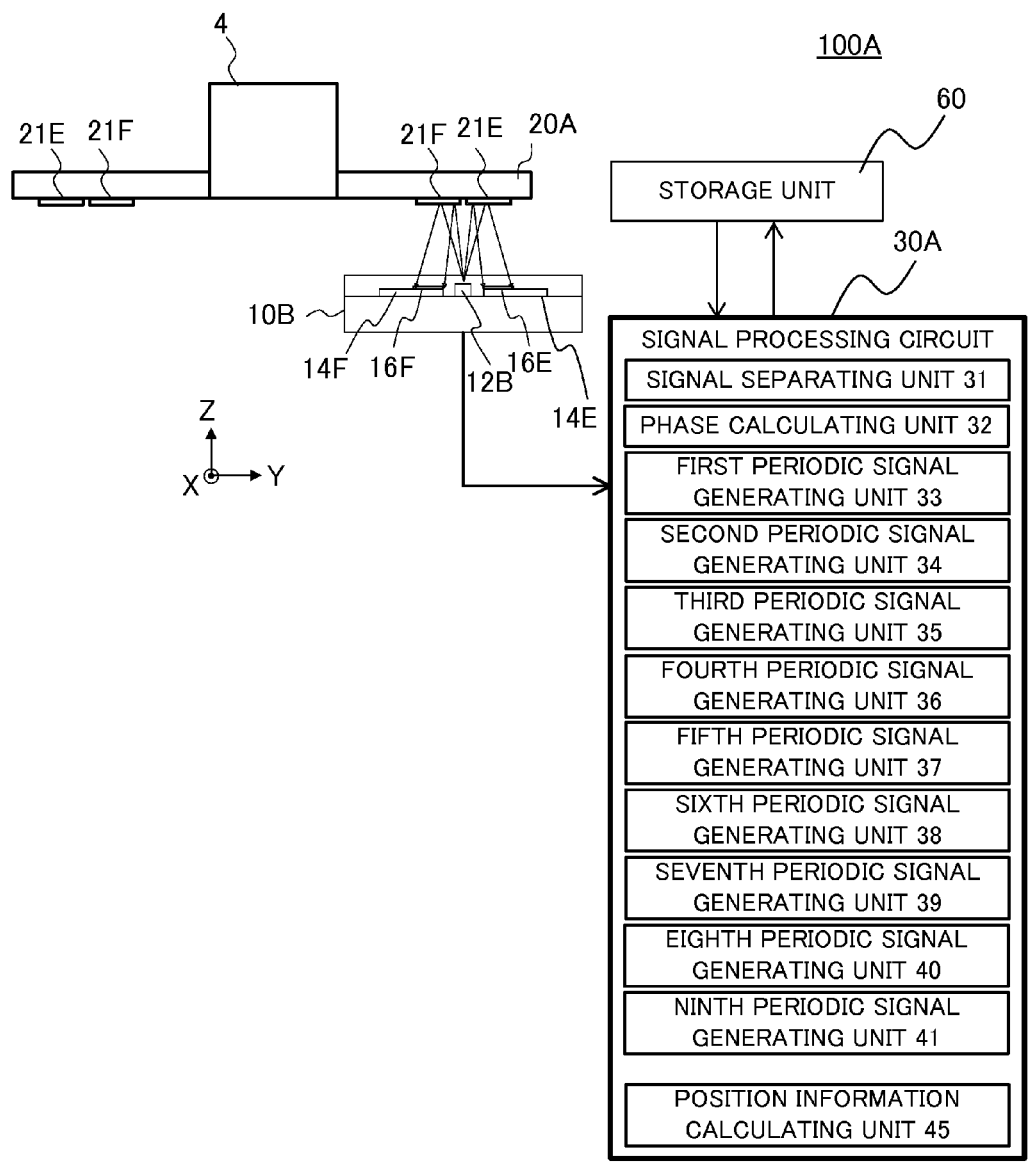
FIG. 6 is a configuration diagram of a position detection apparatus in Embodiment 2.

Next, referring to FIG. 6, a position detection apparatus in Embodiment 2 of the present invention will be described. FIG. 6 is a configuration diagram of a position detection apparatus (an encoder 100A) in the present embodiment. The encoder 100A is an optical encoder, and includes a sensor unit 10B attached to a fixed portion, a rotary scale 20A attached to a movable portion 4 (a rotating movable portion), a signal processing circuit 30A (a signal processor), and a storage unit 60. In the present embodiment, the sensor unit 10B and the scale 20A only need to be movable relative to each other, and the sensor unit 10B may be attached to the movable portion 4 and the scale 20A may be attached to the fixed portion.

The sensor unit 10B is a light emitting and receiving sensor unit which includes a light source 12B including an LED, a light receiving IC 14E including a light receiving element array 16E, and a light receiving IC 14F including a light receiving element array 16F mounted in a package. Each of the light receiving element arrays 16E and 16F functions as a detection element array in which a plurality of detection elements that detect an energy distribution obtained from a pattern of the scale 20A are arrayed in an X direction that is a rotational tangential direction (a length measurement direction) of the scale 20A (or the movable portion 4).

When position information of the scale 20A is to be detected, parts of divergent light beams emitted from the light source 12B of the sensor unit 10B are illuminated on and reflected by a track 21E of the scale 20A. The light beam reflected by the track 21E is received by the light receiving element array 16E of the sensor unit 10B. Other parts of the divergent light beams emitted from the light source 12B of the sensor unit 10B are illuminated on and reflected by the track 21F of the scale 20A. The light beam reflected by the track 21F is received by the light receiving element array 16F of the sensor unit 10B. The light receiving element arrays 16E and 16F receive light beams as double-sized images of reflectance distributions of the tracks 21E and 21F. The light beams received by the light receiving element arrays 16E and 16F are converted into electric signals, and are sent to the signal processing circuit 30A as an encoder signal. The signal processing circuit 30A converts the output signal of the light receiving element arrays 16E and 16F into the position information, and obtains and outputs the position information of the scale 20A (the object) with high accuracy. The signal processing circuit 30A also performs interpolation processing on an encoder signal obtained from the sensor unit 10B, and writes and reads a signal from and to the storage unit 60.

Figure 7:
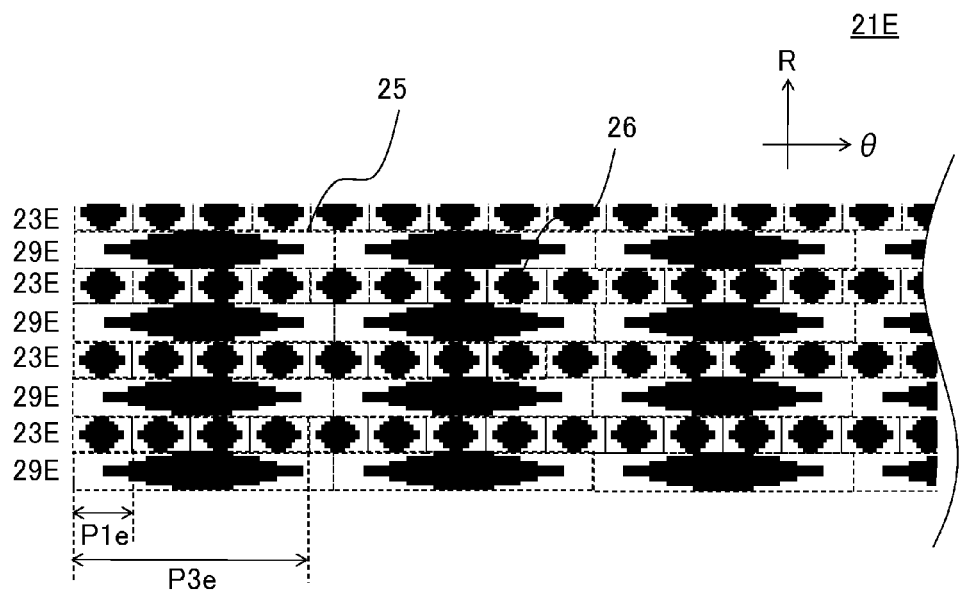
FIG. 7 is a partially enlarged plan view of a track in Embodiment 2.

Subsequently, referring to FIG. 7, the configuration of the track 21E in the present embodiment will be described. FIG. 7 is a partially enlarged plan view of the track 21E. The track 21E includes two types of regions (regions 23E and 29E) which are alternately and periodically arrayed in a direction (R direction) perpendicular to a rotating direction or a moving direction (θ direction) of the scale 20A. The region 23E has a pitch Pie (a first modulation period: $2\pi/1530$ rad in the present embodiment)). The region 29E has a pitch P3e (a second modulation period: $2\pi/360$ rad in the present embodiment). In FIG. 7, a white portion is a non-reflective portion 25 where light transmits or is absorbed, and a black portion is a reflective portion 26 where the light is reflected.

Figure 8:
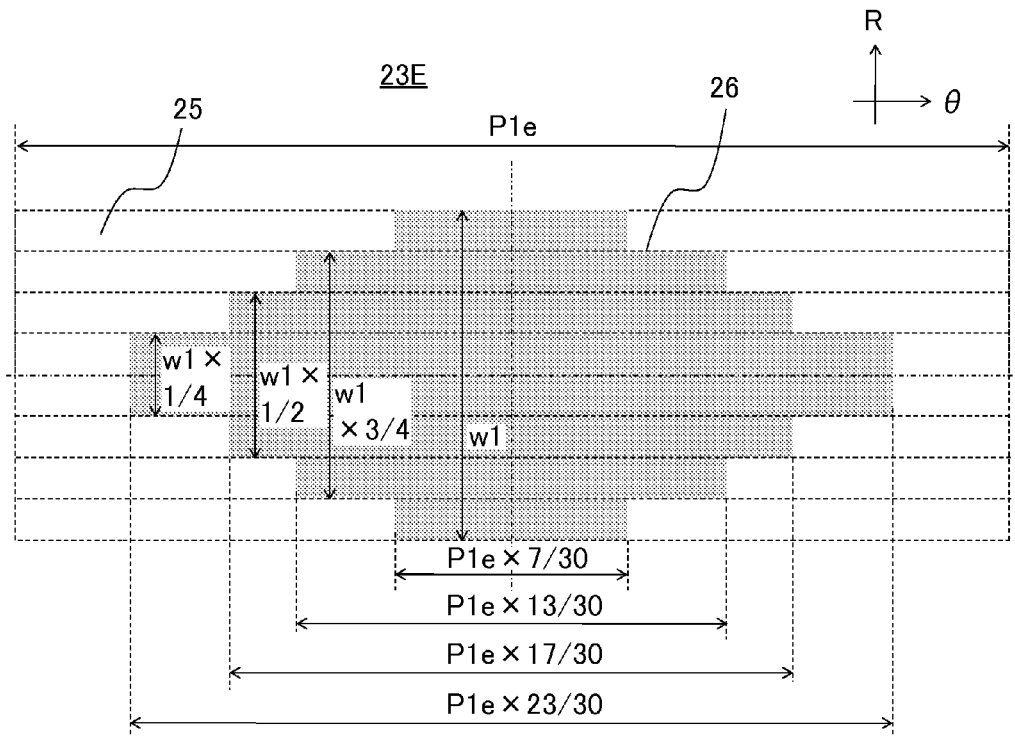
FIG. 8 is a partially enlarged plan view of a track in Embodiment 2.

Subsequently, referring to FIG. 8, the configuration of the region 23E in the present embodiment will be described. FIG. 8 is an enlarged plan view of illustrating one period of the region 23E along the θ direction. The region 23E is constituted by a pattern array which has a pattern illustrated in FIG. 8 for each pitch Pie (the first modulation period) in the θ direction. A radius of the scale in a read region is 31.2 mm, which corresponds to 128 μm when the pitch Pie is converted to a length in a tangential direction. Each pattern is configured by a reflective portion 26 constituted by a reflection film that reflects light and a non-reflective portion 25. In the present embodiment, a width W1 of the region 23E in the R direction is 75 μm.

A width of the reflective portion 26 in the θ direction is different depending on a position of the region 23E in the R direction. The width of the reflective portion 26 in the θ direction is P1e×23/30 within a range where a distance from a center in the R direction is less than or equal to W1/8. The width of the reflective portion 26 in the θ direction is P1e×17/30 within a range where the distance from the center in the R direction is from W1/8 to W1/4. The width of the reflective portion 26 in the θ direction is P1e×13/30 within a range where the distance from the center in the R direction is from W1/4 to W1×3/8. The width of the reflective portion 26 in the θ direction is P1e×7/30 within a range where the distance from the center in the R direction is from W1×3/8 to W1/2.

Figure 9:
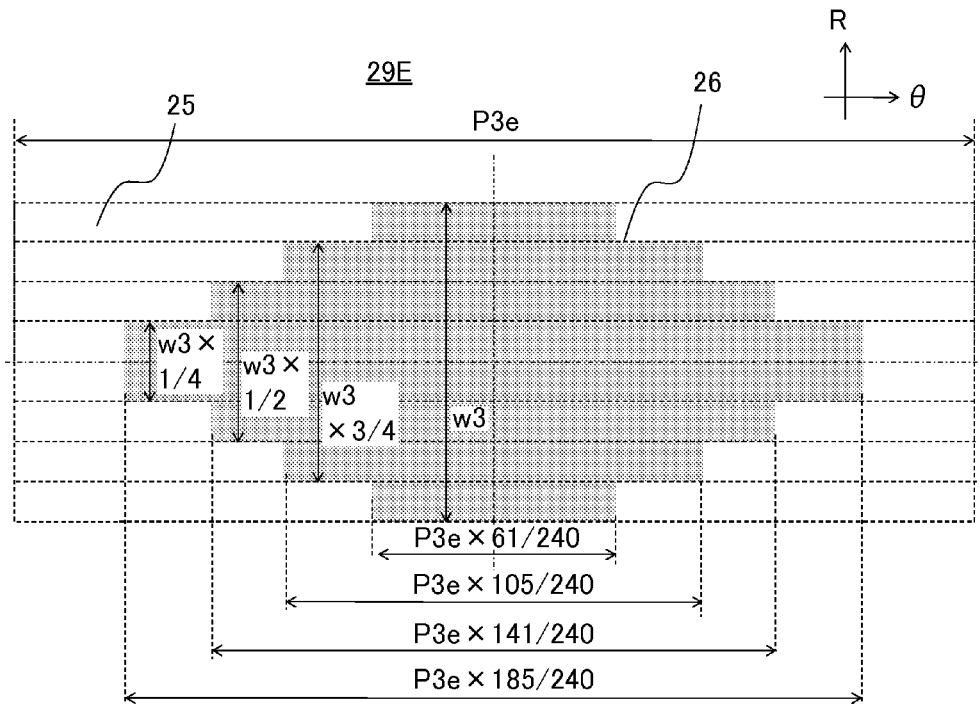
FIG. 9 is a partially enlarged plan view of a track in Embodiment 2.

Subsequently, referring to FIG. 9, the configuration of the region 29E (the second region) in the present embodiment will be described. FIG. 9 is an enlarged plan view of illustrating one period of the region 29E along the θ direction. The region 29E is constituted by a pattern array which has a pattern illustrated in FIG. 9 for each pitch P3e (the second modulation period) in the θ direction. A radius of the scale in a read region is 31.2 mm, which corresponds to 544 μm when the pitch P3e is converted to a length in a tangential direction. Each pattern in the region 29E is configured by a reflective portion 26 constituted by a reflection film that reflects light and a non-reflective portion 25. In the present embodiment, a width W3 of the region 29E in the R direction is 75 μm.

A width of the reflective portion 26 in the θ direction is different depending on a position of the region 29E in the R direction. The width of the reflective portion 26 in the θ direction is P3e×185/240 within a range where a distance from a center in the R direction is less than or equal to W3/8. The width of the reflective portion 26 in the θ direction is P3e×141/240 within a range where the distance from the center in the R direction is from W3/8 to W3/4. The width of the reflective portion 26 in the θ direction is P3e×105/240 within a range where the distance from the center in the R direction is from W3/4 to W3×3/8. The width of the reflective portion 26 in the θ direction is P3e×61/240 within a range where the distance from the center in the R direction is from W3×3/8 to W3/2.

Figure 10:
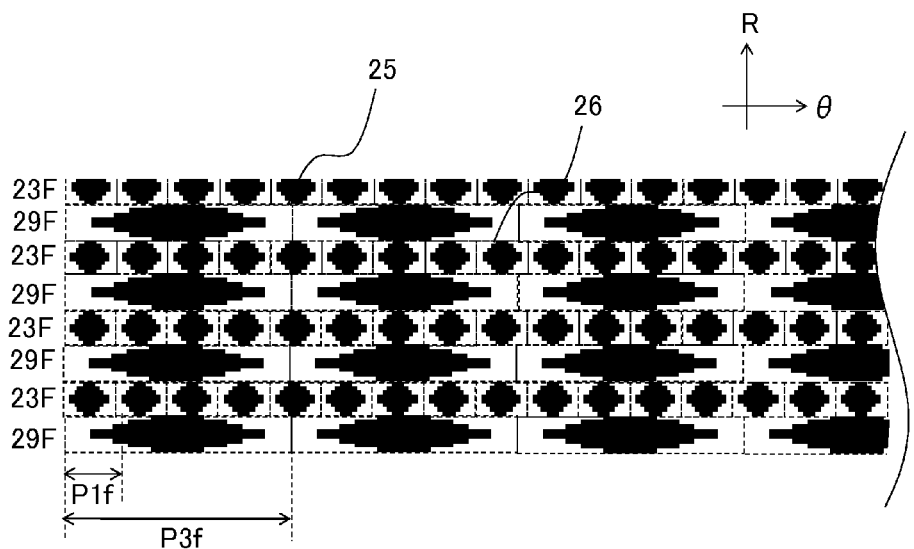
FIG. 10 is a partially enlarged plan view of a track in Embodiment 2.

Subsequently, referring to FIG. 10, the configuration of the track 21F in the present embodiment will be described. FIG. 10 is a partial enlarged plan view of the track 21F. The track 21F includes two types of regions (regions 23F and 29F) which are alternately and periodically arrayed in a direction (R direction) perpendicular to a moving direction or a rotating direction (θ direction) of the scale 20A. The region 23F has a pitch P1f (a first modulation period: $2\pi/1513$ rad in the present embodiment)). The region 29F has a pitch P3f (a second modulation period: $2\pi/356$ rad in the present embodiment). In FIG. 10, a white portion is a non-reflective portion 25 where light transmits or is absorbed, and a black portion is a reflective portion 26 where the light is reflected.

Figure 11:
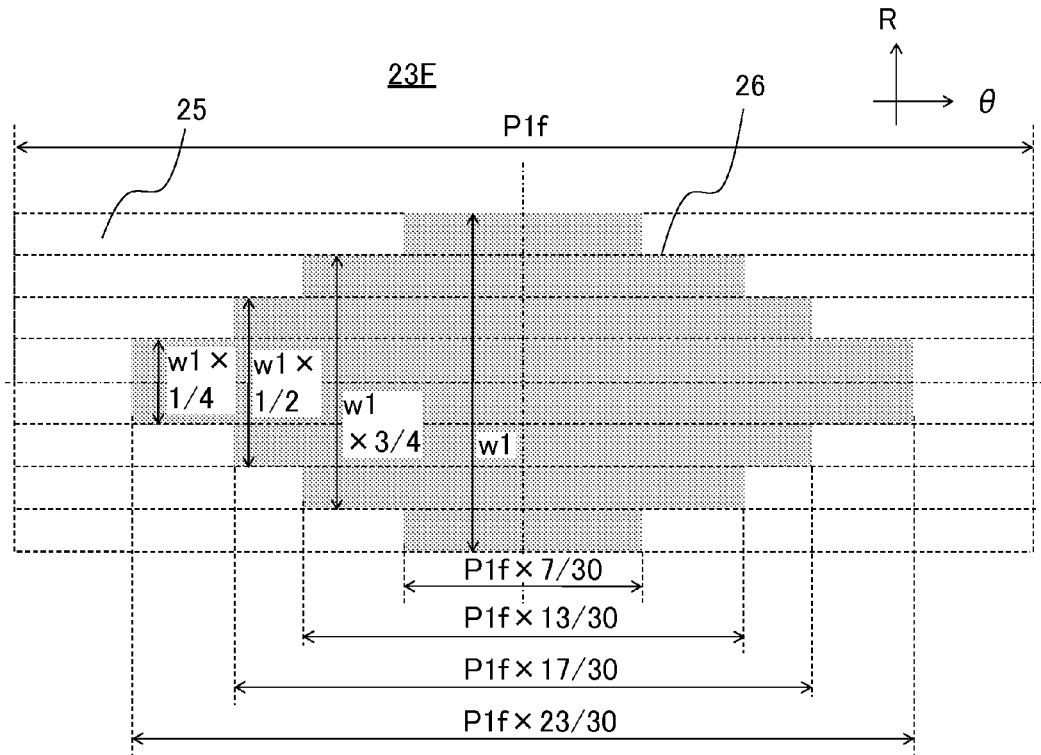
FIG. 11 is a partially enlarged plan view of a track in Embodiment 2.

Subsequently, referring to FIG. 11, the configuration of the region 23F (the first region) in the present embodiment will be described. FIG. 11 is an enlarged plan view of illustrating one period of the region 23F along the θ direction. The region 23F is constituted by a pattern array which has a pattern illustrated in FIG. 11 for each pitch P1f (the first modulation period) in the θ direction. A radius of the scale in a read region is 30.2 mm, which corresponds to 125 μm when the pitch P1f is converted to a length in a tangential direction. Each pattern is configured by a reflective portion 26 constituted by a reflection film that reflects light and a non-reflective portion 25. As described above, the pitch P1f functions as the first modulation period. In the present embodiment, a width W1 of the region 23F in the R direction is 75 μm.

A width of the reflective portion 26 in the θ direction is different depending on a position of the region 23F in the R direction. The width of the reflective portion 26 in the θ direction is P1f×23/30 within a range where a distance from a center in the R direction is less than or equal to W1/8. The width of the reflective portion 26 in the θ direction is P1f×17/30 within a range where the distance from the center in the R direction is from W1/8 to W1/4. The width of the reflective portion 26 in the θ direction is P1f×13/30 within a range where the distance from the center in the R direction is from W1/4 to W1×3/8. The width of the reflective portion 26 in the θ direction is P1f×7/30 within a range where the distance from the center in the R direction is from W1×3/8 to W1/2.

Figure 12:
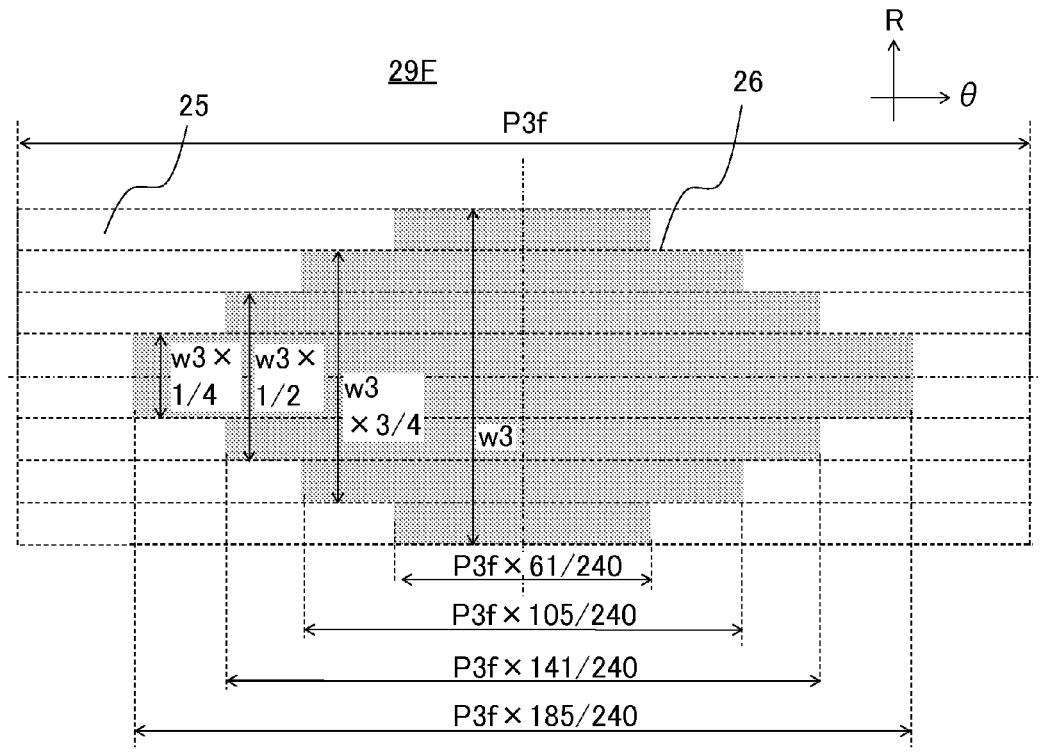
FIG. 12 is a partially enlarged plan view of a track in Embodiment 2.

Subsequently, referring to FIG. 12, the configuration of the region 29F (the second region) will be described. FIG. 12 is an enlarged plan view of illustrating one period of the region 29F along the θ direction. The region 29F is constituted by a pattern array which has a pattern illustrated in FIG. 12 for each pitch P3f (the second modulation period: $2\pi/356$ rad in the embodiment) in the θ direction. A radius of the scale in a read region is 30.2 mm, which corresponds to 532 μm when the pitch P3f is converted to a length in a tangential direction. Each pattern in the region 29F is configured by a reflective portion 26 constituted by a reflection film that reflects light and a non-reflective portion 25. In the present embodiment, a width W3 of the region 29F in the R direction is 75 μm.

A width of the reflective portion 26 in the θ direction is different depending on a position of the region 29F in the R direction. The width of the reflective portion 26 in the θ direction is P3f×185/240 within a range where a distance from a center in the R direction is less than or equal to W3/8. The width of the reflective portion 26 in the θ direction is P3f×141/240 within a range where the distance from the center in the R direction is from W3/8 to W3/4. The width of the reflective portion 26 in the θ direction is P3f×105/240 within a range where the distance from the center in the R direction is from W3/4 to W3×3/8. The width of the reflective portion 26 in the θ direction is P3f×61/240 within a range where the distance from the center in the R direction is from W3×3/8 to W3/2.

In FIG. 6, the signal processing circuit 30A of the present embodiment includes a signal separating unit 31, a phase calculating unit 32, first to ninth periodic signal generating units 33 to 41, and a position information calculating unit 45 in addition to a noise filter, an amplifier circuit, and an A/D converter (not shown). The signal separating unit 31 separates outputs of the light receiving element arrays 16E and 16F into a signal corresponding to each region of the tracks 21E and 21F. When the light receiving ICs 14E and 14F are provided with a switching function and a switch circuit of a spatial resolution, the signal separating unit 31 sends a signal which switches a connections of the switch circuit. On the other hand, when the light receiving ICs 14E and 14F are not provided with the switching function and the switch circuit of the spatial resolution, the signal separating unit 31 performs a fast Fourier transform (FFT) to separate the signals. Alternatively, the signal separating unit 31 may be achieved by providing the light receiving element arrays 16E and 16F with a light receiving element which has a separated light receiving surface for each pattern pitch.

Figure 13:
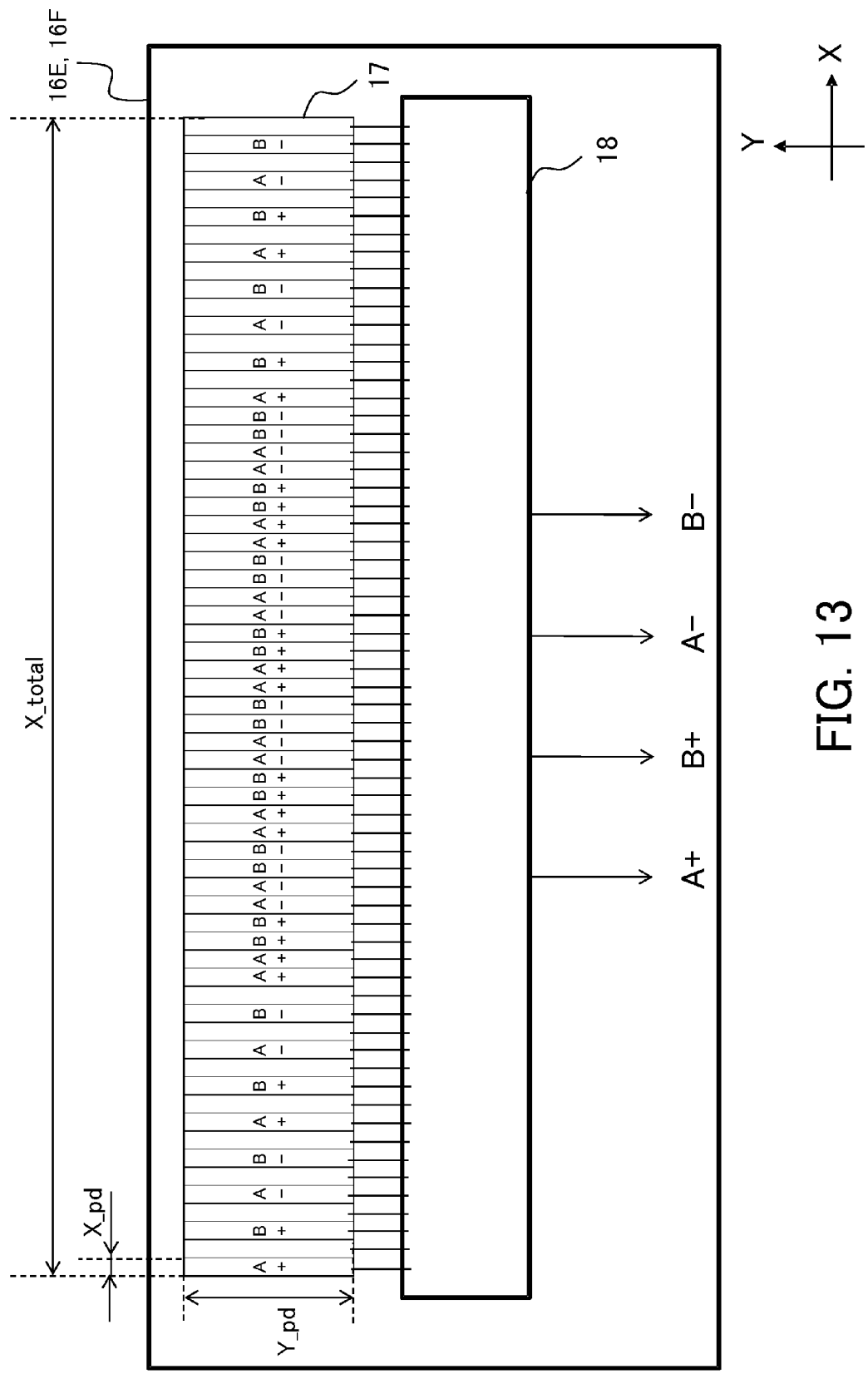
FIG. 13 is a plan view of a light receiving surface of a light receiving element array in Embodiment 2.
Figure 14:
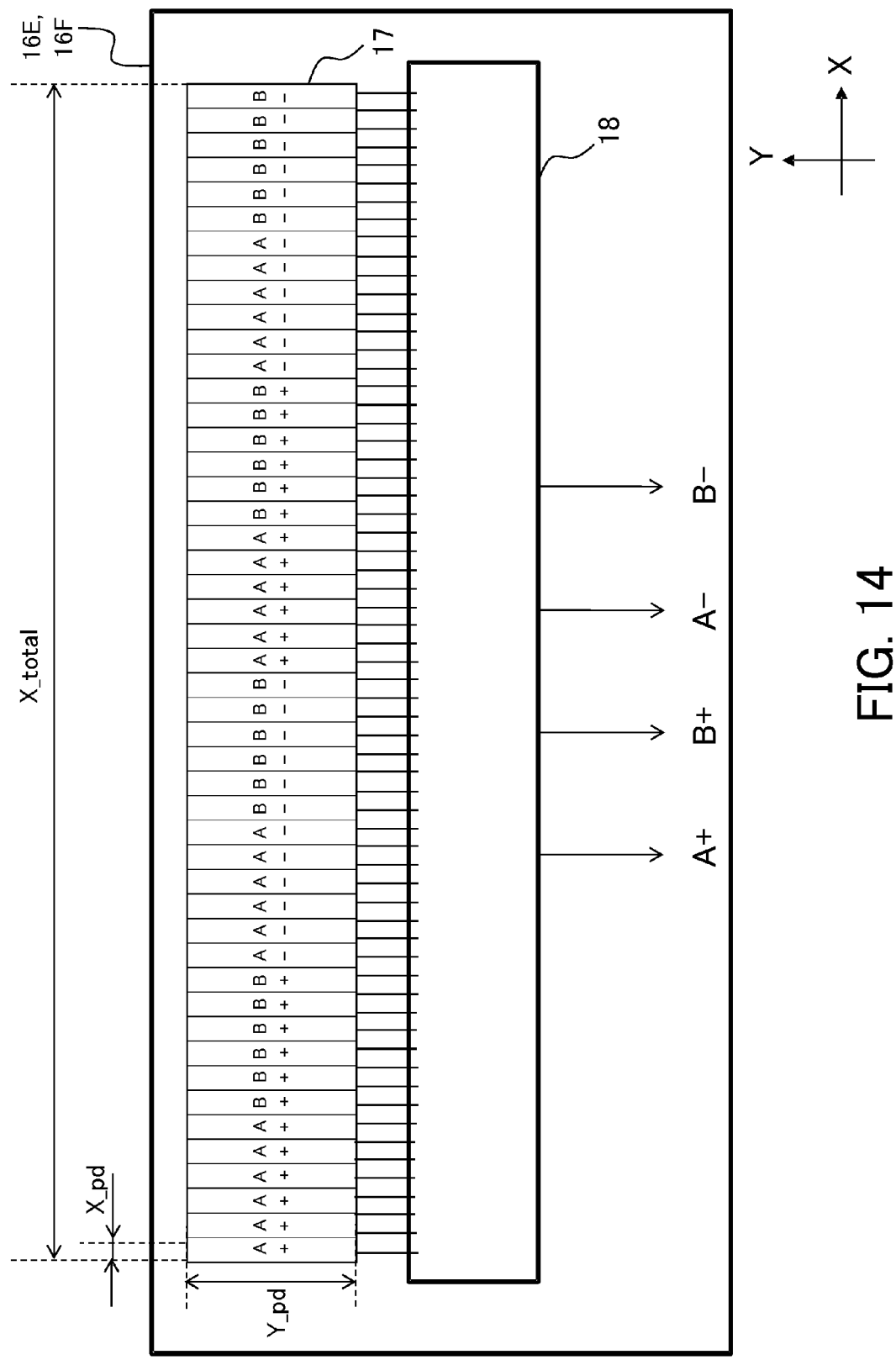
FIG. 14 is a plan view of the light receiving surface of the light receiving element array in Embodiment 2.
Figure 15A:
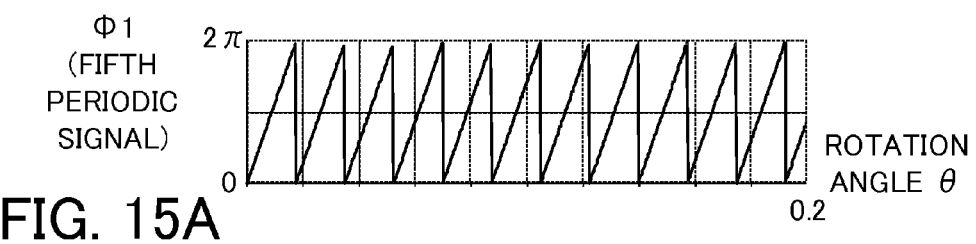
FIGS. 15A to 15D are diagrams of illustrating relationships between periodic signals Φ1, Φ2, Φ3, and Φ4 respectively, and a rotation angle θ in Embodiment 2.
Figure 15B:
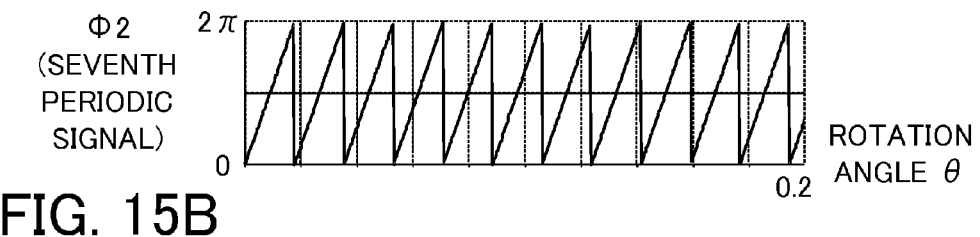
Figure 15C:
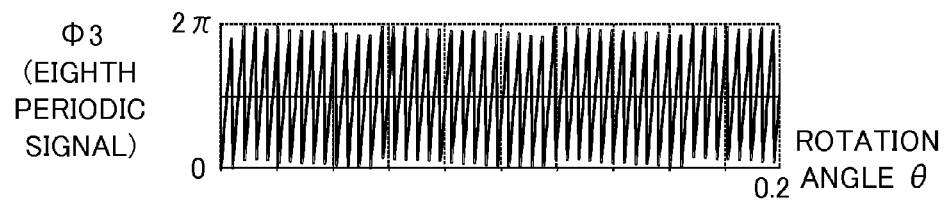
Figure 15D:
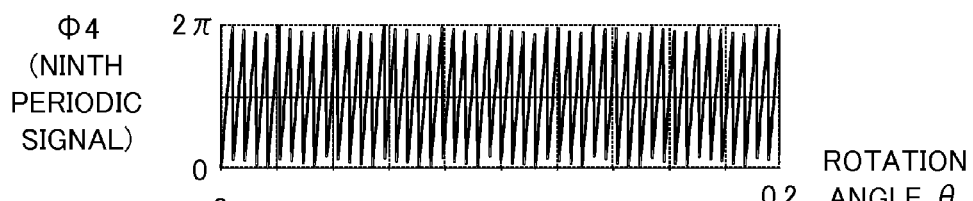

Subsequently, referring to FIGS. 13 and 14, the configurations of the light receiving element arrays 16E and 16F will be described. FIGS. 13 and 14 are plan views of the light receiving surfaces of the light receiving element arrays 16E and 16F. The light receiving element arrays 16E and 16F have a configuration common to each other. In each of the light receiving element arrays 16E and 16F, 64 light receiving elements 17 are arrayed with a pitch of 32 µm in an X direction. A width X_pd of one of the light receiving elements 17 in the X direction is 32 µm, and a width Y_pd of the light receiving element 17 in a Y direction is 900 µm. A total width X_total of each of the light receiving element arrays 16E and 16F is 2048 µm.

Since a double-sized image of a pattern on the scale 20A is projected, a detection range on the scale 20A is a range within 450 µm in the Y direction and 1024 µm in the X direction. Therefore, the detection range on the scale 20A includes three lines along the Y direction of each of the regions 23E and 23F having a pitch of around 128 µm and the regions 29E and 29F having a pitch of around 512 µm in a tangential direction.

The output of each of the light receiving elements 17 is switched by a switch circuit 18, and is selectively connected to four first amplifiers (not shown) at the latter stage. The four first amplifiers are connected to the light receiving elements corresponding to output terminals A+, B+, A−, and B−, which represents A+ phase, B+ phase, A− phase, and B− phase respectively, to output four-phase sine-wave outputs S(A+), S(B+), S(A−), and S(B−).

The switch circuit 18 can switch the connection between the light receiving elements 17 and the output terminals according to the input from the signal separating unit 31 of the signal processing circuit 30A. As a result, an interval of electric additions by the plurality of light receiving elements 17 is switched.

When the input from the signal processing circuit 30A is at a high level, as illustrated in FIG. 13, a detection pitch of the scale pattern of 128 µm (a period of a reflected image of 256 µm) is obtained, and therefore periodic signals obtained from the regions 23E and 23F are only separated. An area of the light receiving element arrays of each phase corresponding to each period corresponds to two light receiving elements at a center portion of the light receiving surface, and on the other hand corresponds to one light receiving element at a peripheral portion. Thus, in the present embodiment, the sensor unit 10B is provided with a weighting unit. The weighting is set so that a weighted value is not more than an unweighted value within a predetermined range which includes a spatial frequency corresponding to P3 of a spatial frequency response.

On the other hand, when the input from the signal processing circuit 30A is at a low level, as illustrated in FIG. 14, a detection pitch of the scale pattern of 512 µm (a period of the reflected image of 1024 µm) is obtained, and therefore periodic signals obtained from the regions 29E and 29F are only separated.

Relative phases of the four-phase sine-wave signals have relations of around +90 degrees for S(B+), around +180 degrees for S(A−), and around +270 degrees for S(B−) with reference to S(A+) for each of the detection pitches. The signal processing circuit 30A performs calculations represented by the following Expressions (12) and (13) for the four-phase sine-wave outputs S(A+), S(B+), S(A−), and S(B−) to generate two-phase sine-wave signals S(A) and S(B) in which a direct component is removed.

$$S(A)=S(A+)-S(A-) \tag{12}$$

$$S(B)=S(B+)-S(B-) \tag{13}$$

In this case, S(A) which is determined in the case where the input is at the low level is cancelled by a differential calculation of Expression (12) since S(A+) and S(A−) have the same phase component for the image of the scale pitch of 128 µm. The same is true for S(B).

Based on S(A) and S(B) determined when the input to the switch circuit 18 is at the high level, the phase calculating unit 32 of the signal processing circuit 30A obtains a phase ΦH (a phase signal) of the energy distributions of the regions 23E and 23F by the calculation represented as the following Expression (14).

$$\Phi H = A\ TAN\ 2[S(A),S(B)] \tag{14}$$

In Expression (14), symbol A TAN 2[Y,X] is an arctangent function that determines a quadrant to convert the phase into a phase of 0 to 2π.

Similarly, based on S(A) and S(B) determined when the input to the switch circuit 18 is at the low level, the phase calculating unit 32 of the signal processing circuit 30A obtains a phase ΦL (a phase signal) of the energy distributions of the regions 29E and 29F by the calculation represented as the following Expression (15).

$$\Phi L = A\ TAN\ 2[S(A),S(B)] \tag{15}$$

Next, a procedure of converting the signals outputted from the light receiving ICs 14E and 14F into an absolute position signal will be described. The fifth periodic signal generating unit 37 obtains a signal (a fifth periodic signal) that satisfies Φ1=360θ based on the phase signal ΦL obtained from the light receiving IC 14E. The seventh periodic signal generating unit 39 obtains a signal (a seventh periodic signal) that satisfies Φ2=356θ based on the phase signal ΦL obtained from the light receiving IC 14F. The eighth periodic signal generating unit 40 obtains a signal (an eighth periodic signal) that satisfies Φ3=1530θ based on the phase signal ΦH obtained from the light receiving IC 14E. The ninth periodic signal generating unit 41 obtains a signal (a ninth periodic signal) that satisfies Φ4=1513θ based on the phase signal ΦH obtained from the light receiving IC 14F. An offset is added to each of the phase signals so that the phases become zero simultaneously at a predetermined position. FIGS. 15A to 15D illustrate relationships between the periodic signals Φ1, Φ2, Φ3, and Φ4 (the detected values) respectively, and the rotation angle θ.

Subsequently, the fourth periodic signal generating unit 36 generates the periodic signal Φ5 (the fourth periodic signal) by the calculation represented as the following Expression (16) by using the periodic signals Φ1 and Φ3.

$$\Phi 5 = MOD\ [\Phi 3 - 4 \cdot \Phi 1, 2\pi] = 90\theta \tag{16}$$

Thus, the fourth periodic signal generating unit 36 generates the fourth periodic signal (the periodic signal Φ5) by using the fifth periodic signal (the periodic signal Φ1) and the eighth periodic signal (the periodic signal Φ3).

The sixth periodic signal generating unit 38 generates the periodic signal Φ6 (the sixth periodic signal) by the calculation represented as the following Expression (17) by using the periodic signals Φ2 and Φ4.

$$\Phi 6 = \text{MOD} [\Phi 4 - 4 \cdot \Phi 2, 2\pi] = 89\theta \qquad (17)$$

Figure 16A:
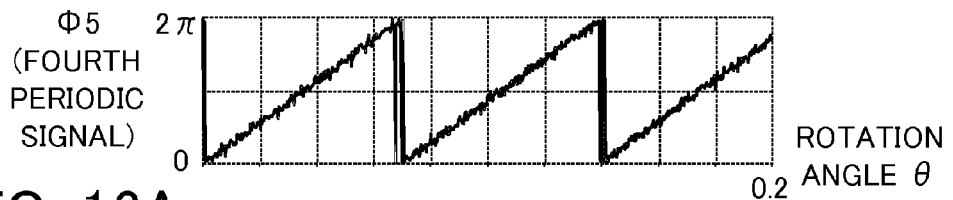
FIGS. 16A to 16F are diagrams of illustrating relationships between periodic signals Φ5, Φ6, Φ(5,1), Φ(6,2), Φ((5,1),3), Φ((6,2),4) respectively, and the rotation angle θ in Embodiment 2.
Figure 16B:
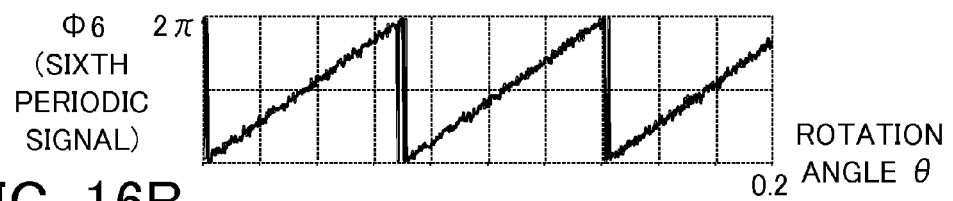

FIGS. 16A and 16B illustrate relationships between the periodic signals Φ5 and Φ6 respectively, and the rotation angle θ of the movable portion 4.

Subsequently, the first periodic signal generating unit 33 calculates a position of the periodic signal Φ1 within a period of the periodic signal Φ5 (the number of periods where the phase of the periodic signal Φ1 is positioned) by using the periodic signals Φ5 and Φ1, and connects the periodic signals Φ1. Thus, the periodic signal Φ(5,1) having the same period as the period of the periodic signal Φ5 is obtained with an accuracy equivalent to a position detection accuracy of the periodic signal Φ1. In the present embodiment, the processing is referred to as first synthesis processing. The periodic signal Φ(5,1) is obtained by the calculation represented by the following Expression (18).

$$\Phi(5,1) = \text{MOD} [(2\pi \cdot \text{ROUND}[(4 \cdot \Phi 5 - \Phi 1)/(2\pi)] + \Phi 1) \cdot 1/4, 2\pi] \qquad (18)$$

Figure 16C:
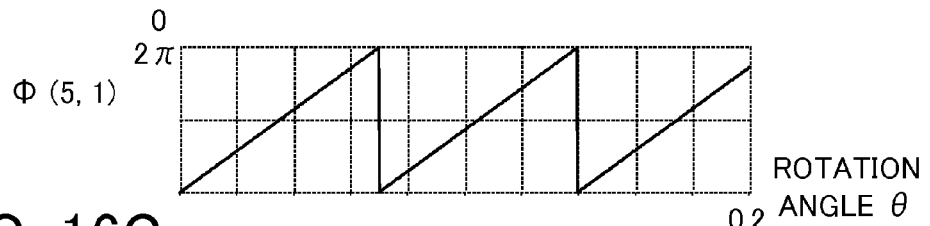

In Expression (18), symbol ROUND[x] denotes a function of converting x into the nearest integer. Symbol MOD [x,y] denotes a remainder where x is a dividend and y is a divisor. The remainder of 2π as a divisor is obtained in order to express the phase as a value more than or equal to 0 but less than 2π. FIG. 16C illustrates a relationship between the periodic signal Φ(5,1) obtained by the first synthesis processing and the rotation angle θ of the movable portion 4.

The first periodic signal generating unit 33 also calculates a position of the periodic signal Φ3 within a period of the periodic signal Φ(5,1) (the number of periods where the phase of the periodic signal Φ3 is positioned) by using the periodic signals Φ(5,1) and Φ3, and connects the periodic signals Φ3. Thus, the periodic signal Φ((5,1),3) having the same period as the period of the periodic signal Φ(5,1), i.e. the first periodic signal, can be obtained with an accuracy equivalent to a position detection accuracy of the periodic signal Φ3. In the present embodiment, the processing is referred to as second synthesis processing. The periodic signal Φ((5,1),3) is obtained by the calculation represented by the following Expression (19).

$$\Phi((5,1),3) = \text{MOD} [(2\pi \cdot \text{ROUND}[(17 \cdot \Phi(5,1) - \Phi 3)/(2\pi)] + \Phi 3) \cdot 1/17, 2\pi] \qquad (19)$$

Figure 16D:
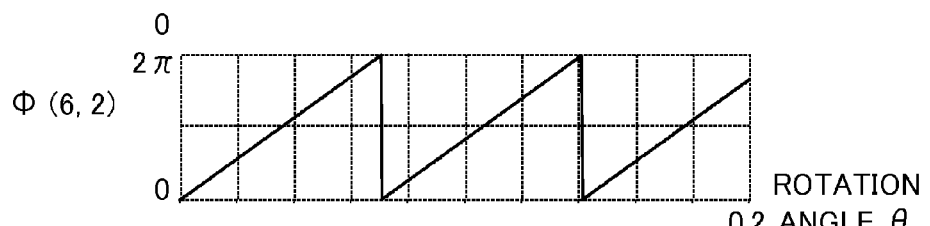
Figure 16E:
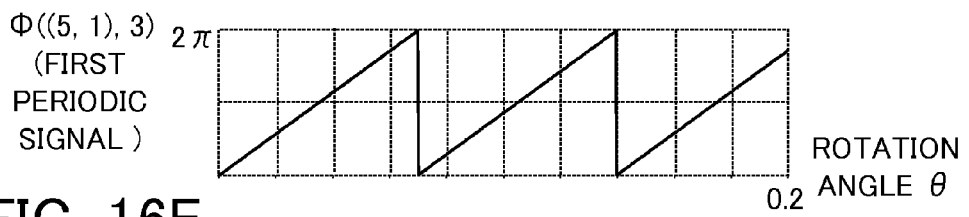

FIG. 16E illustrates a relationship between the periodic signal Φ((5,1),3) obtained by the second synthesis processing and the rotation angle θ of the movable portion 4.

Similarly, the second periodic signal generating unit 34 calculates a position of the periodic signal Φ2 within a period of the periodic signal Φ6 (the number of periods where the phase of the periodic signal Φ2 is positioned) by using the periodic signals Φ6 and Φ2, and connects the periodic signals Φ2. Thus, the periodic signal Φ(6,2) having the same period as the period of the periodic signal Φ6 can be obtained with an accuracy equivalent to a position detection accuracy of the periodic signal Φ2. In the present embodiment, the processing is referred to as third synthesis processing. The periodic signal Φ(6,2) is obtained by the calculation represented by the following Expression (20).

$$\Phi(6,2) = \text{MOD} [(2\pi \cdot \text{ROUND}[(4 \cdot \Phi 6 - \Phi 1)/(2\pi)] + \Phi 2) \cdot 1/4, 2\pi] \qquad (20)$$

FIG. 16D illustrates a relationship between the periodic signal Φ(6,2) obtained by the third synthesis processing and the rotation angle θ of the movable portion 4.

The second periodic signal generating unit 34 also calculates a position of the periodic signal Φ4 within a period of the periodic signal Φ(6,2) (the number of periods where the phase of the periodic signal Φ4 is positioned) by using the periodic signals Φ(6,2) and Φ3, and connects the periodic signals Φ4. Thus, the periodic signal Φ((6,2),4) having the same period as the period of the periodic signal Φ(6,2), i.e. the second periodic signal, can be obtained with an accuracy equivalent to a position detection accuracy of the periodic signal Φ4. In the present embodiment, the processing is referred to as fourth synthesis processing. The periodic signal Φ((6,2),4) is obtained by the calculation represented by the following Expression (21).

$$\Phi((6,2),4) = \text{MOD} [(2\pi \cdot \text{ROUND}[(17 \cdot \Phi(6,2) - \Phi 4)/(2\pi)] + \Phi 4) \cdot 1/17, 2\pi] \qquad (21)$$

Figure 16F:
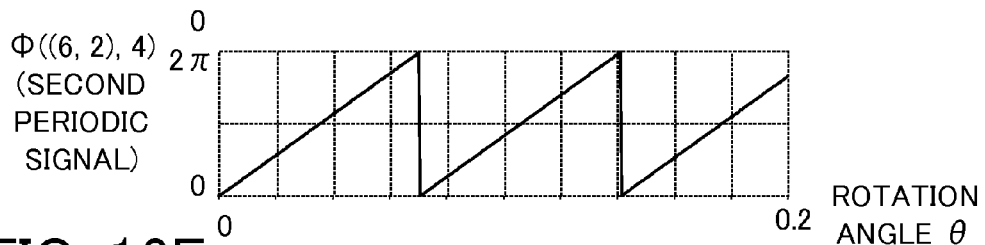

FIG. 16F illustrates a relationship between the periodic signal Φ((6,2),4) obtained by the fourth synthesis processing and the rotation angle θ of the movable portion 4.

The third periodic signal generating unit 35 obtains the periodic signal Φ7 having the longest period (the third periodic signal) by the calculation represented as the following Expression (22).

$$\Phi 7 = \text{MOD} [\Phi((5,1),3) - \Phi((6,2),4), 2\pi] = 1\theta \qquad (22)$$

Figure 17A:
FIGS. 17A and 17B are diagrams of illustrating relationships between a periodic signals Φ7 and an absolute position signal ΦABS respectively, and the rotation angle θ in Embodiment 2.

FIG. 17A illustrates a relationship between the periodic signal Φ7 and the rotation angle θ of the movable portion 4.

Subsequently, a procedure of calculating the absolute position signal based on the periodic signals Φ7 and Φ((5,1),3)) generated as above will be described. In the present embodiment, the periodic signal Φ7 is a first level signal that has the longest period. The periodic signal Φ((5,1),3)) is a second level signal. The position information calculating unit 45 uses the first and second level signals to generate a periodic signal which has the same period as that of the first level signal with an accuracy equivalent to a position detection accuracy of the second level signal as an absolute position signal ΦABS. In the present embodiment, the processing is referred to as fifth synthesis processing. The absolute position signal ΦABS is calculated by the calculation represented as the following Expression (23).

$$\Phi \text{ABS} = \text{MOD} [(2\pi \cdot \text{ROUND}[(90 \cdot \Phi 7 - \Phi((5,1),3))/(2\pi)] + \Phi((5,1),3)) \cdot 1/90, 2\pi] \qquad (23)$$

Figure 17B:
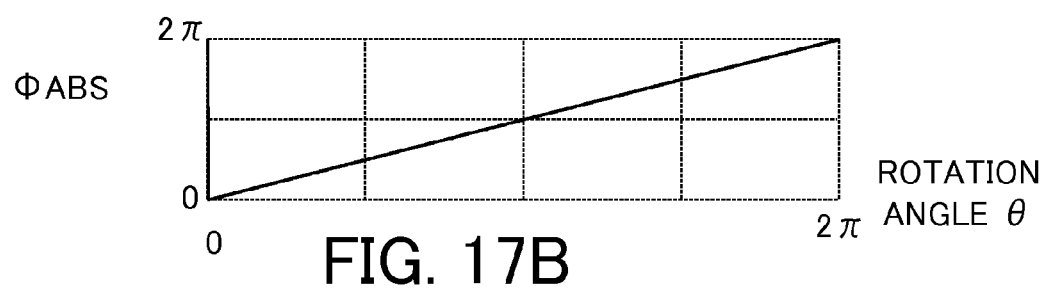

FIG. 17B illustrates a relationship between the absolute position signal ΦABS obtained by the fifth synthesis processing and the rotation angle θ of the movable portion 4. Thus, the absolute position can be detected over a whole circumference.

In the present embodiment, periodic signals which are different from the pattern (a periodic modulation pattern) on the scale 20A are generated by the calculation as the periodic signals Φ5 and Φ6 (the fourth periodic signal and the sixth periodic signal). In other words, the period of the fourth periodic signal (and the sixth periodic signal) is different from the period of the pattern of the scale 20A. As a result, the linearity of the signal which is used to generate an upper-level signal can be further improved. Commonly, when an integer is added to an original periodic signal to calculate a difference as the calculation of generating the periodic signals Φ5 and Φ6, the linearity is extremely deteriorated since a phase becomes an integral multiple at the same time. On the other hand, when periodic signals of integral multiples of the two original signal periods generated by the two periodic signals as described in the present embodiment are further synthesized by the two original signals, a long periodic signal with high accuracy can be obtained. When the upper-level signal having a longer period is generated by using this long periodic signal with high accuracy, an error permissible amount in detecting the absolute position signal can be increased even if a large magnification is applied to a period of the original signal to generate a long periodic signal.

In the present embodiment, the phases obtained from the two modulation patterns on the scale are detected by using the light receiving surface, a part of which is common to each other. In other words, at least a part of the detection element array which is used to generate at least two periodic signals of the fourth, fifth, sixth, seventh, and eighth periodic signals is common to each other. In this configuration, two periodic signals can be obtained at approximately the same read position to improve the synchronization performance between the signals. In addition, effects of reduction of a pattern width on the scale and reduction in size of a sensor can be achieved. When the characteristics of separating the signals are not sufficient, an error increases compared to a case where different light receiving surfaces are used, but the influence can be reduced by performing the synthesis processing described above to enlarge the error permissible amount.

Embodiment 3

Figure 18:
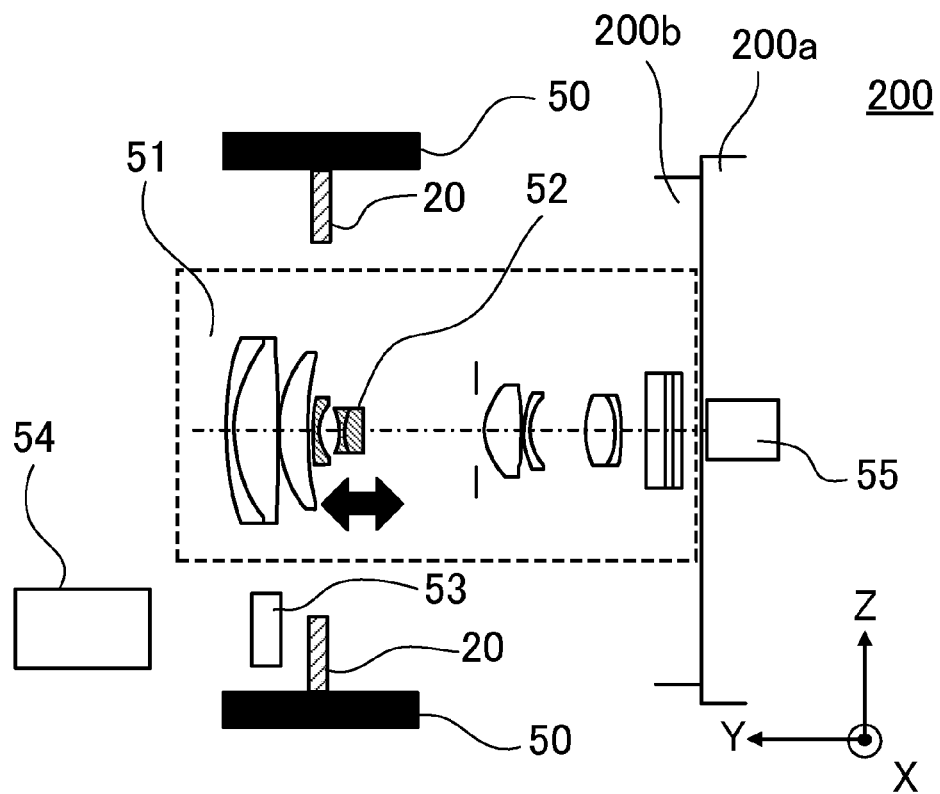
FIG. 18 is a schematic diagram of a cross section of an image pickup system in Embodiment 3.

Next, referring to FIG. 18, Embodiment 3 of the present invention will be described. FIG. 18 is a schematic diagram of a cross section of an image pickup system 200 in the present embodiment. The image pickup system 200 is an image pickup system which mounts the encoder (the position detection apparatus) in each of the embodiments described above on a lens apparatus. The image pickup system 200 includes an image pickup apparatus 200a and a lens apparatus 200b (a lens barrel including the encoder) which is removably mounted on the image pickup apparatus 200a. However, the present embodiment is also applicable to an image pickup system which includes an image pickup apparatus and a lens apparatus integrated with each other.

In FIG. 18, reference numeral 53 denotes a sensor unit, and reference numeral 54 denotes a CPU. The sensor unit 53 and the CPU 54 (and the scale 20) constitute an encoder. In the present embodiment, the sensor unit 53 corresponds to each of the sensor units 10A and 10B in Embodiments 1 and 2 respectively, and the CPU 54 corresponds to each of the signal processing circuits 30 and 30A in Embodiments 1 and 2 respectively. Reference numeral 51 denotes a lens unit, reference numeral 52 denotes a drive lens, reference numeral 55 denotes an image pickup element, and reference numeral 50 denotes a cylindrical body, which mainly constitute an image pickup system. The drive lens 52 (a lens) constituting the lens unit 51 is for example an autofocus lens, which is displaceable in a Y direction that is an optical axis direction. The drive lens 52 may also be other lenses such as a zooming lens that is a lens to be driven. The cylindrical body 50 in the present embodiment is coupled to an actuator (not shown) that drives the drive lens 52. The image pickup element 55 is provided in an image pickup apparatus 200a, which photoelectrically converts an optical image (an object image) formed via the lens unit 51 (the lens).

A lens apparatus 200b of the present embodiment includes the drive lens 52 displaceable in the optical axis direction (the Y direction) and the encoder 100 (or the encoder 100A) configured to detect a displacement of the drive lens 52. The scale 20 is attached to the cylindrical body 50. In this configuration, the encoder 100 (the encoder 100A) obtains a rotation amount (the displacement) around the optical axis direction of the cylindrical body 50 to detect the displacement of the drive lens 52 in the optical axis direction.

The scale 20 is a rotary scale that is configured by forming a radial pattern formed on a doughnut-shaped disk surface, which is attached to the cylindrical body 50. The scale 20 may also be a linear scale that is configured by forming a grating pattern on a film material. In this case, the scale is applied to a cylindrical surface along a rotation direction of the cylindrical body 50.

When the cylindrical body 50 is rotated around the optical axis as a center by an actuator or by hand (manually), the scale 20 is displaced relative to the sensor unit 53. The drive lens 52 is driven in the Y direction (an arrow direction) that is the optical axis direction depending on the displacement of the scale 20. The signal depending on the displacement of the drive lens 52 obtained from the sensor unit 53 of the encoder is outputted to the CPU 54. The CPU 54 generates a drive signal to move the drive lens 52 to a desired position. The drive lens 52 is driven based on the drive signal.

The position detection apparatus of each embodiment is also applicable to various kinds of apparatuses other than the lens apparatus or the image pickup apparatus. For instance, a machine tool apparatus can be configured by a machine tool including a movable member such as a robot arm or a conveyer to convey an object to be assembled, and the position detection apparatus of each embodiment which detects a position or an attitude of the machine tool, and thus a position of the robot arm or the conveyer can be detected with high accuracy.

The position detection apparatus (the encoder 100 or 100A) of each embodiment is an absolute-type position detection apparatus capable of detecting an absolute position. "Absolute position" used in each embodiment means a relative position of a pattern (or an object to be measured having the pattern thereon) with respect to a detector (the sensor unit) or a relative position of a moving object to be measured with respect to a fixed portion. The absolute-type position detection apparatus is an apparatus capable of detecting a relative position ("absolute position" used in the embodiment) between them in a measurement performed by the detector.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the position detection apparatus of each embodiment described above, an error permissible amount of an original signal to detect an absolute position signal can be enlarged, and the absolute position signal with a long stroke can be stably detected. Therefore, according to each embodiment, a position detection apparatus, a lens apparatus, an image pickup system, a machine tool apparatus, a position detection method, a program, and a storage medium which are capable of detecting an absolute position over a wide range with high accuracy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-052748, filed on Mar. 15, 2013, which is hereby incorporated by reference herein in its entirety.

What is claimed is:

1. A position detection apparatus detecting a position of an object, the position detection apparatus comprising:
   a scale including a pattern that is periodically arranged;
   a detector configured to be movable relative to the scale and output a signal that changes according to a relative position between the scale and the detector,
   wherein one of the scale or the detector moves together with the object; and
   a signal processor configured to process an output signal of the detector to obtain position information of the object, wherein the signal processor comprises:
      a first periodic signal generating unit configured to generate a first periodic signal;
      a second periodic signal generating unit configured to generate a second periodic signal having a period different from a period of the first periodic signal;
      a third periodic signal generating unit configured to generate a third periodic signal having a period longer than the period of each of the first and second periodic signals using the first and second periodic signals;
      a fourth periodic signal generating unit configured to generate a fourth periodic signal having the same period as the period of the first periodic signal;
      a fifth periodic signal generating unit configured to generate a fifth periodic signal having a period which is a fraction of an integer of the period of the fourth periodic signal;
      a sixth periodic signal generating unit configured to generate a sixth periodic signal having the same period as the period of the second periodic signal; and
      a seventh periodic signal generating unit configured to generate a seventh periodic signal having a period that is a fraction of an integer of the period of the sixth periodic signal, and
      wherein the first periodic signal generating unit synthesizes the fourth periodic signal and the fifth periodic signal to generate the first periodic signal,
      wherein the second periodic signal generating unit synthesizes the sixth periodic signal and the seventh periodic signal to generate the second periodic signal, and
      wherein the signal processor includes a position information calculating unit configured to obtain the position information of the object using the first periodic signal and the third periodic signal.

2. The position detection apparatus according to claim 1, wherein:
   the first periodic signal generating unit specifies a position of the fifth periodic signal within the period of the fourth periodic signal using the fourth periodic signal and the fifth periodic signal to generate the first periodic signal, and
   the second periodic signal generating unit specifies a position of the seventh periodic signal within the period of the sixth periodic signal using the sixth periodic signal and the seventh periodic signal to generate the second periodic signal.

3. The position detection apparatus according to claim 1, wherein the fifth periodic signal and the seventh periodic signal are the same.

4. The position detection apparatus according to claim 1, wherein:
   the detector includes a detection element array configured so that a plurality of detection elements are arrayed in a moving direction, and
   at least a part of the plurality of detection elements is used to generate at least two periodic signals of the fourth, fifth, sixth, and seventh periodic signals.

5. The position detection apparatus according to claim 1, wherein:
   the signal processor further comprises an eighth periodic signal generating unit configured to generate an eighth periodic signal having a period that is a fraction of an integer of the period of the fourth periodic signal and is different from the period of the fifth periodic signal, and
   the fourth periodic signal generating unit generates the fourth periodic signal using the fifth periodic signal and the eighth periodic signal.

6. The position detection apparatus according to claim 5, wherein:
   the detector includes a detection element array configured so that a plurality of detection elements are arrayed in a moving direction, and
   at least a part of the plurality of detection elements is used to generate at least two periodic signals of the fourth, fifth, sixth, seventh, and eighth periodic signals.

7. The position detection apparatus according to claim 5, wherein the period of the fourth periodic signal is different from a period of the pattern of the scale.

8. A lens apparatus comprising:
   a lens displaceable in an optical axis direction; and
   a position detection apparatus configured to detect a position of the lens,
   wherein the position detection apparatus comprises:
      a scale including a pattern that is periodically arranged;
      a detector configured to be movable relative to the scale and output a signal that changes according to a relative position between the scale and the detector,
      wherein one of the scale or the detector moves together with the object; and
      a signal processor configured to process an output signal of the detector to obtain position information of the lens,
      wherein the signal processor comprises:
         a first periodic signal generating unit configured to generate a first periodic signal;
         a second periodic signal generating unit configured to generate a second periodic signal having a period different from a period of the first periodic signal;
         a third periodic signal generating unit configured to generate a third periodic signal having a period longer than the period of each of the first and second periodic signals using the first and second periodic signals;

a fourth periodic signal generating unit configured to generate a fourth periodic signal having the same period as the period of the first periodic signal;
a fifth periodic signal generating unit configured to generate a fifth periodic signal having a period that is a fraction of an integer of the period of the fourth periodic signal;
a sixth periodic signal generating unit configured to generate a sixth periodic signal having the same period as the period of the second periodic signal; and
a seventh periodic signal generating unit configured to generate a seventh periodic signal having a period that is a fraction of an integer of the period of the sixth periodic signal,
wherein the first periodic signal generating unit synthesizes the fourth periodic signal and the fifth periodic signal to generate the first periodic signal,
wherein the second periodic signal generating unit synthesizes the sixth periodic signal and the seventh periodic signal to generate the second periodic signal, and
wherein the signal processor includes a position information calculating unit configured to obtain the position information of the object using the first periodic signal and the third periodic signal.

9. An image pickup system comprising:
a lens apparatus; and
an image pickup apparatus including an image pickup element configured to photoelectrically convert an optical image formed via the lens,
wherein the lens apparatus comprises:
  a lens displaceable in an optical axis direction; and
  a position detection apparatus configured to detect a position of the lens,
wherein the position detection apparatus comprises:
  a scale including a pattern that is periodically arranged;
  a detector configured to be movable relative to the scale and output a signal that changes according to a relative position between the scale and the detector,
  wherein one of the scale or the detector moves together with the object; and
  a signal processor configured to process an output signal of the detector to obtain position information of the lens,
  wherein the signal processor comprises:
    a first periodic signal generating unit configured to generate a first periodic signal;
    a second periodic signal generating unit configured to generate a second periodic signal having a period different from a period of the first periodic signal;
    a third periodic signal generating unit configured to generate a third periodic signal having a period longer than the period of each of the first and second periodic signals using the first and second periodic signals;
    a fourth periodic signal generating unit configured to generate a fourth periodic signal having the same period as the period of the first periodic signal;
    a fifth periodic signal generating unit configured to generate a fifth periodic signal having a period that is a fraction of an integer of the period of the fourth periodic signal;
    a sixth periodic signal generating unit configured to generate a sixth periodic signal having the same period as the period of the second periodic signal; and
    a seventh periodic signal generating unit configured to generate a seventh periodic signal having a period that is a fraction of an integer of the period of the sixth periodic signal,
    wherein the first periodic signal generating unit synthesizes the fourth periodic signal and the fifth periodic signal to generate the first periodic signal, and
    wherein the second periodic signal generating unit synthesizes the sixth periodic signal and the seventh periodic signal to generate the second periodic signal, and
    wherein the signal processor includes a position information calculating unit configured to obtain the position information of the object using the first periodic signal and the third periodic signal.

10. A machine tool apparatus comprising:
a machine tool including at least one of a robot arm or a conveyer configured to convey an object to be assembled; and
a position detection apparatus configured to detect at least one of a positioner or an attitude of the machine tool, the position detection apparatus comprising:
  a scale including a pattern that is periodically arranged;
  a detector configured to be movable relative to the scale and output a signal that changes according to a relative position between the scale and the detector,
  wherein one of the scale or the detector moves together with the object; and
  a signal processor configured to process an output signal of the detector to obtain position information of the machine tool,
  wherein the signal processor comprises:
    a first periodic signal generating unit configured to generate a first periodic signal;
    a second periodic signal generating unit configured to generate a second periodic signal having a period different from a period of the first periodic signal;
    a third periodic signal generating unit configured to generate a third periodic signal having a period longer than the period of each of the first and second periodic signals using the first and second periodic signals;
    a fourth periodic signal generating unit configured to generate a fourth periodic signal having the same period as the period of the first periodic signal;
    a fifth periodic signal generating unit configured to generate a fifth periodic signal having a period that is a fraction of an integer of the period of the fourth periodic signal;
    a sixth periodic signal generating unit configured to generate a sixth periodic signal having the same period as the period of the second periodic signal; and
    a seventh periodic signal generating unit configured to generate a seventh periodic signal having a period that is a fraction of an integer of the period of the sixth periodic signal,
    wherein the first periodic signal generating unit synthesizes the fourth periodic signal and the fifth periodic signal to generate the first periodic signal,
    wherein the second periodic signal generating unit synthesizes the sixth periodic signal and the seventh periodic signal to generate the second periodic signal, and
    wherein the signal processor includes a position information calculating unit configured to obtain the position information of the object using the first periodic signal and the third periodic signal.

11. A method of detecting a position of an object which that moves along with a scale including a pattern that is periodically arranged or a detector, based on an output signal from the detector, the detector being configured to be movable relative to the scale and output a signal that changes according to a relative position between the scale and the detector, wherein one of the scale or the detector moves together with the object, the method comprising the steps of:

generating a fourth periodic signal having a period same as a period of a first periodic signal, a fifth periodic signal having a period that is a fraction of an integer of the period of the fourth periodic signal, a sixth periodic signal having a period same as a period of a second periodic signal, the second periodic signal having the period different from the period of the first periodic signal, and a seventh periodic signal having a period that is a fraction of an integer of the period of the sixth periodic signal;

synthesizing the fourth periodic signal and the fifth periodic signal to generate the first periodic signal;

synthesizing the sixth periodic signal and the seventh periodic signal to generate the second periodic signal;

generating a third periodic signal having a period longer than the period of each of the first and second periodic signals using the first and second periodic signals; and obtaining position information of the object using the first periodic signal and the third periodic signal.

12. A non-transitory computer-readable storage medium storing a program executable by a computer to execute a method of detecting a position of an object that moves along with a scale including a pattern that is periodically arranged or a detector, based on an output signal from the detector, the detector being configured to be movable relative to the scale and output a signal that changes according to a relative position between the scale and the detector, wherein one of the scale or the detector moves together with the object, the method comprising the steps of:

generating a fourth periodic signal having a period same as a period of a first periodic signal, a fifth periodic signal having a period that is a fraction of an integer of the period of the fourth periodic signal, a sixth periodic signal having a period same as a period of a second periodic signal, the second periodic signal having the period different from the period of the first periodic signal, and a seventh periodic signal having a period that is a fraction of an integer of the period of the sixth periodic signal;

synthesizing the fourth periodic signal and the fifth periodic signal to generate the first periodic signal;

synthesizing the sixth periodic signal and the seventh periodic signal to generate the second periodic signal;

generating a third periodic signal having a period longer than the period of each of the first and second periodic signals using the first and second periodic signals; and obtaining position information of the object using the first periodic signal and the third periodic signal.

\* \* \* \* \*